United States Patent
Itsumi

(10) Patent No.: US 10,230,581 B2
(45) Date of Patent: Mar. 12, 2019

(54) NETWORK MANAGEMENT METHOD AND APPARATUS

(71) Applicant: NEC Corporation, Tokyo (JP)

(72) Inventor: Hayato Itsumi, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 15/117,179

(22) PCT Filed: Feb. 5, 2015

(86) PCT No.: PCT/JP2015/000527
§ 371 (c)(1),
(2) Date: Aug. 5, 2016

(87) PCT Pub. No.: WO2015/118876
PCT Pub. Date: Aug. 13, 2015

(65) Prior Publication Data
US 2016/0352582 A1    Dec. 1, 2016

(30) Foreign Application Priority Data

Feb. 6, 2014 (JP) ................... 2014-020977

(51) Int. Cl.
*H04L 12/24*  (2006.01)
*H04L 12/46*  (2006.01)
*H04L 12/715* (2013.01)

(52) U.S. Cl.
CPC .......... *H04L 41/12* (2013.01); *H04L 12/4641* (2013.01); *H04L 41/22* (2013.01); *H04L 45/64* (2013.01)

(58) Field of Classification Search
CPC ....... H04L 45/586; H04L 45/04; H04L 45/64; H04L 45/12; H04L 41/12; H04L 41/22; H04L 49/70; H04L 12/4641

(Continued)

(56) References Cited

U.S. PATENT DOCUMENTS 7,681,130 B1 * 3/2010 Lavallee ................. H04L 41/22
715/735
7,937,438 B1 * 5/2011 Miller ..................... H04L 41/12
370/397

(Continued)

FOREIGN PATENT DOCUMENTS

JP    2002-314587    10/2002
JP    2012-175418    9/2012

OTHER PUBLICATIONS

"Network Functions Virtualisation (NFV)", Update White Paper, at the "SDN and Open-Flow World Congress", Frankfurt-Germany, (http://portal.etsi.org/NFV/NFV_White_Paper2.pdf, pp. 1-16, Oct. 2013.

(Continued)

*Primary Examiner* — Ruolei Zong
(74) *Attorney, Agent, or Firm* — Finnegan, Henderson, Farabow, Garrett & Dunner, L.L.P.

(57) ABSTRACT

A management method and apparatus which allows easy management of virtual network function deployment on a network are provided. A network management apparatus generates an extended topology in which a virtual network function that can be deployed on a server is added as an extended node ((VNF(A), VNF(B)) to a topology of the network; and displays an optimum path (RP1, RP2, RP3) in the extended topology on display means (400b) when a requirement of at least one virtual network function and endpoint nodes involved in the requirement are input through an input means (401, 402), wherein the optimum path is obtained based on network resource information of the network and computing resource information of servers on which at least one virtual network function can be deployed.

8 Claims, 30 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 8,971,335 | B2* | 3/2015 | Harel | H04L 45/38 370/401 |
| 2008/0181110 | A1* | 7/2008 | Ramakrishnan | H04L 41/0896 370/232 |
| 2009/0327903 | A1* | 12/2009 | Smith | H04L 41/12 715/737 |
| 2013/0329734 | A1 | 12/2013 | Chesla et al. | |
| 2013/0346585 | A1* | 12/2013 | Ueno | H04L 45/02 709/223 |
| 2015/0082308 | A1* | 3/2015 | Kiess | G06F 9/5072 718/1 |
| 2015/0124622 | A1* | 5/2015 | Kovvali | H04W 28/0215 370/236 |

OTHER PUBLICATIONS

"Interface to the Routing System (I2RS) for Service Chaining: Use Cases and Requirements", Internet Engineering Task Force I2RS working group Internet Draft, Jul. 2013.

W. John et al., "Research Directions in Network Service Chaining" in SDN4FNS 2013, 2013 Workshop on Software Defined Networks for Future Networks and Services, IEEE, Nov. 2013.

D. Sasou, "Latest Trends in SDN/OpenFlow and NFV", vol. 278, pp. 15-23, Dec. 2013.

International Search Report and Written Opinion dated Apr. 21, 2015, in corresponding PCT International Application.

Notification of Reasons for Refusal (Japanese Office Action) dated Aug. 7, 2018, and an English-language machine translation, issued by the Japanese Patent Office (JPO) in counterpart Japanese Patent Application No. 2015-561228.

* cited by examiner

FIG. 5

DATABASE 111

| NETWORK TOPOLOGY | | PARAMETER |
|---|---|---|
| COMPONENT | COMPONENT INFORMATION | |
| LINK | FROM: N1 TO: N2 | COMMUNICATION BANDWIDTH, USE BANDWIDTH, ... |
| | FROM: N3 TO: N4 | COMMUNICATION BANDWIDTH, USE BANDWIDTH, ... |
| | ... | ... |
| SWITCH (NW NODE) | NODE ID: N1 | AVAILABILITY, ... |
| | NODE ID: N2 | AVAILABILITY, ... |
| | ... | ... |
| SERVER SV | NODE ID: SV1 | CPU USAGE, MEMORY USAGE, ... |
| | NODE ID: SV2 | CPU USAGE, MEMORY USAGE, ... |
| | ... | ... |
| VIRTUAL MACHINE VM (VNF) | NODE ID: VNF_A | REQUIREMENT, ... |
| | NODE ID: VNF_B | REQUIREMENT, ... |
| ... | ... | ... |

Parameter columns grouped as: NETWORK-RELATED PARAMETERS (FIRST PARAMETERS) and COMPUTING-RESOURCE-RELATED PARAMETERS (SECOND PARAMETERS).

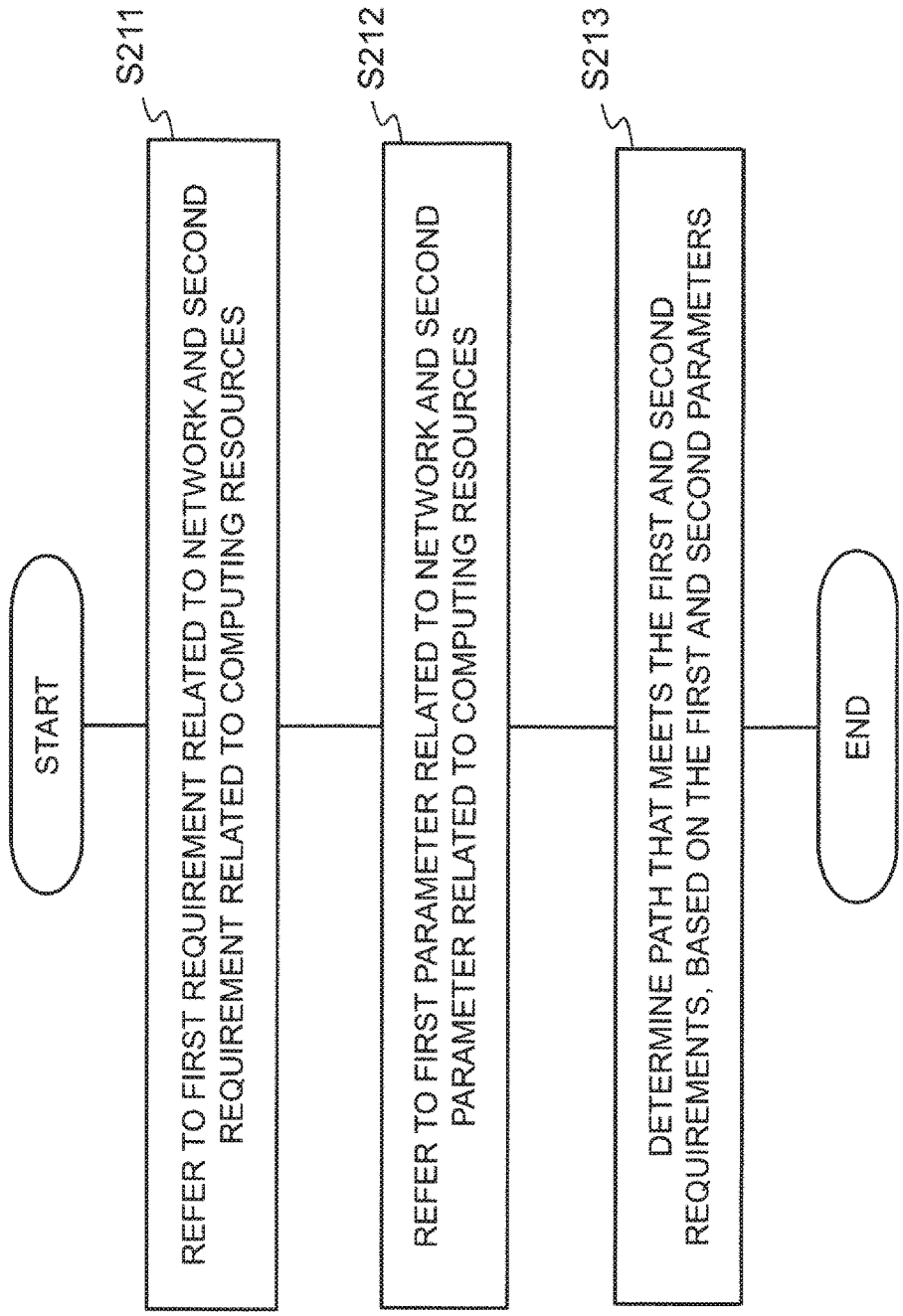

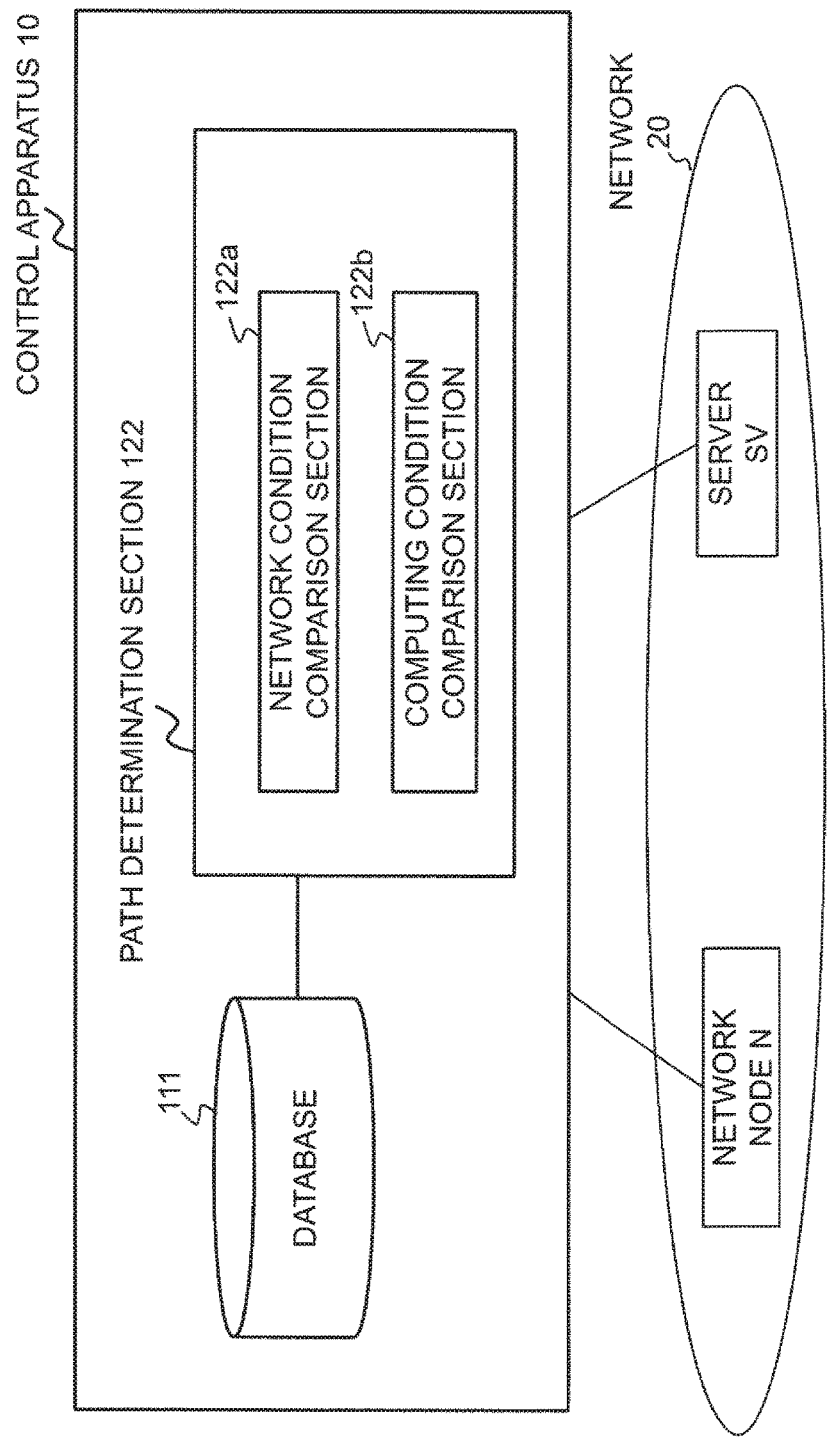

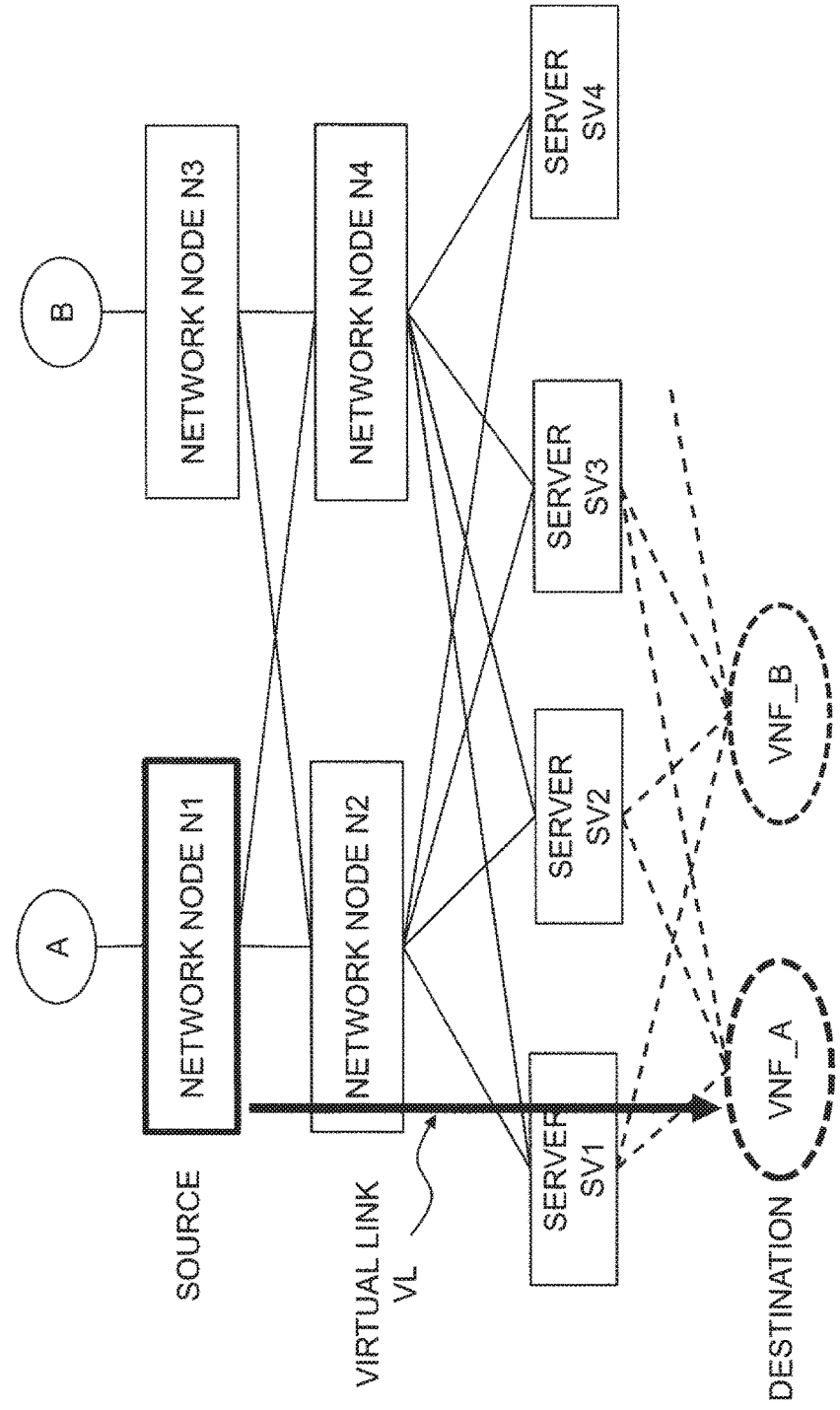

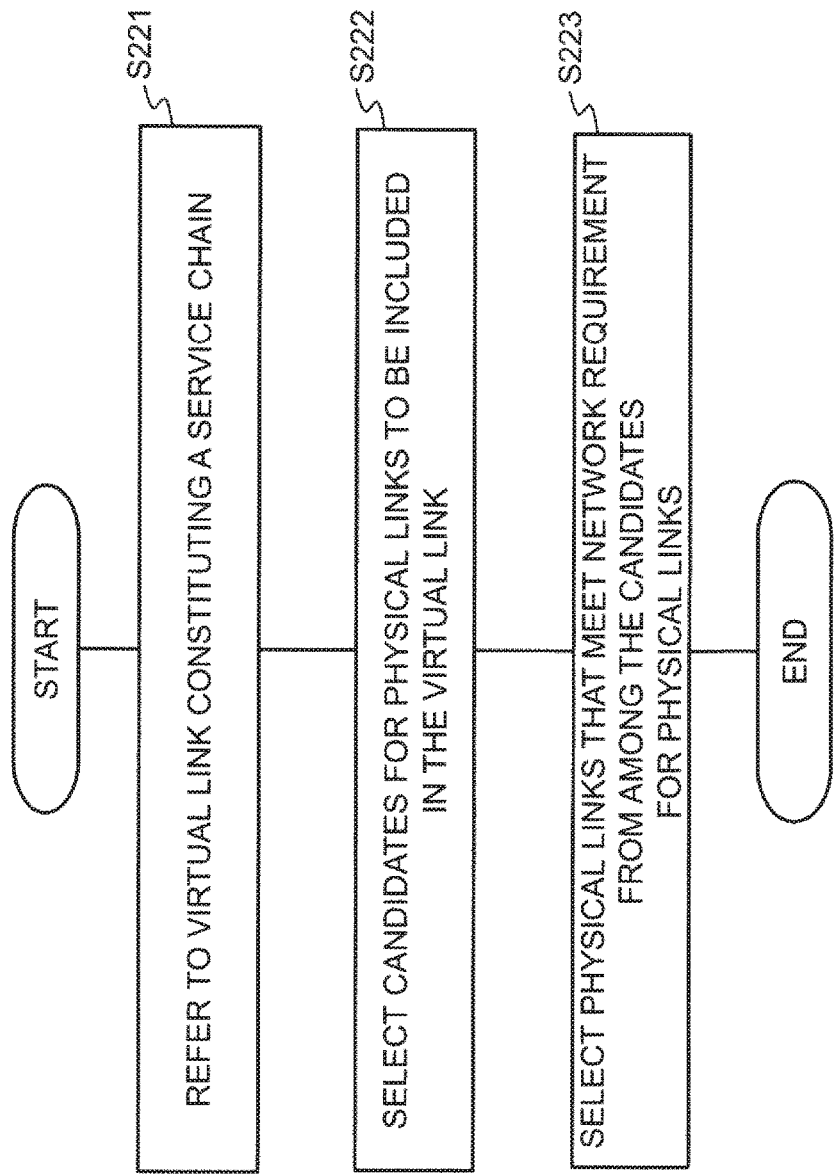

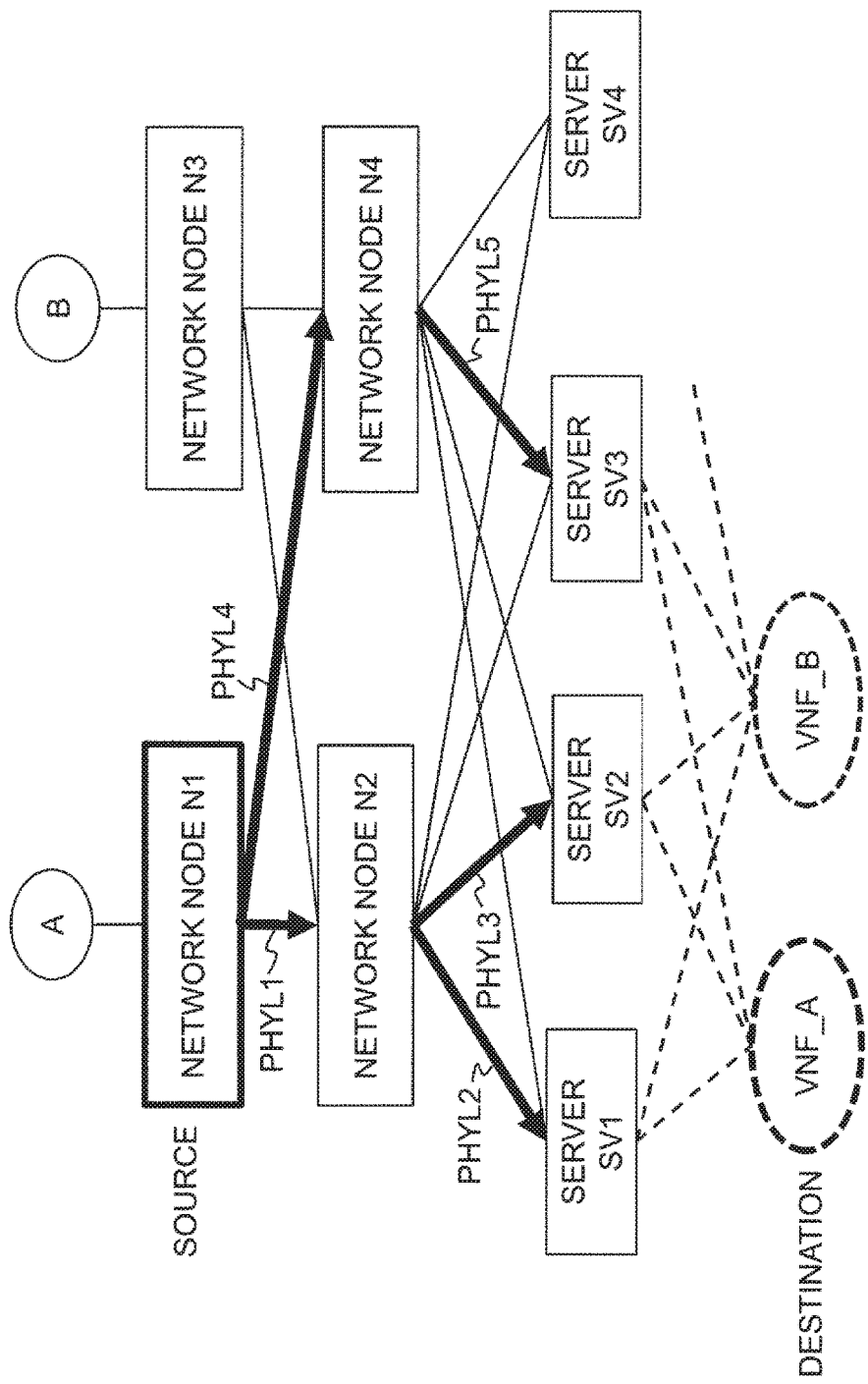

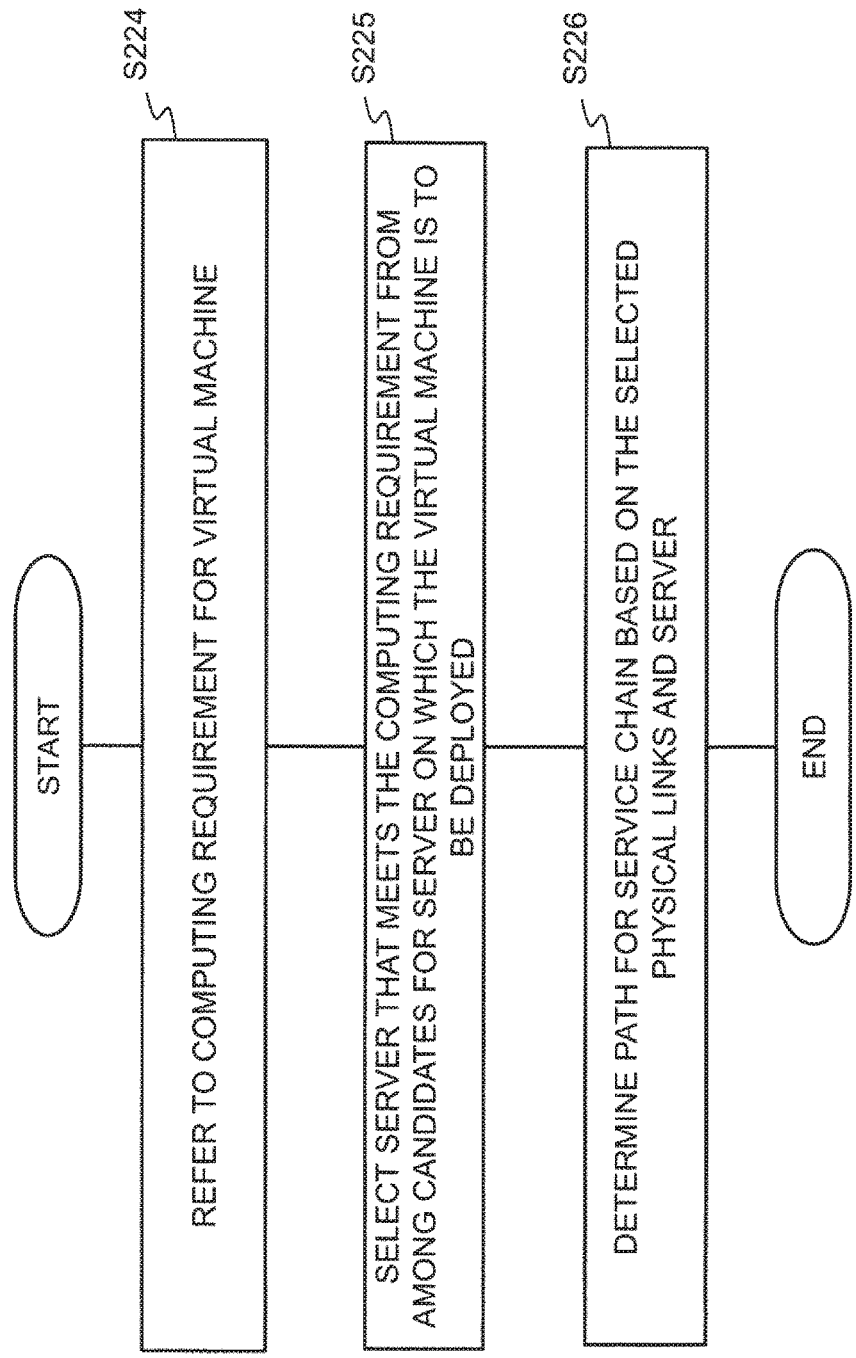

DETERMINATION OF DEPLOYMENT-TARGET SERVER AND PATH FOR SERVICE CHAIN

FIG. 14 THIRD EXEMPLARY EMBODIMENT

SIXTH EXEMPLARY EMBODIMENT

<NF FORWARDING GRAPH>

<UNDERLAY NETWORK TOPOLOGY>

Computing Constraint

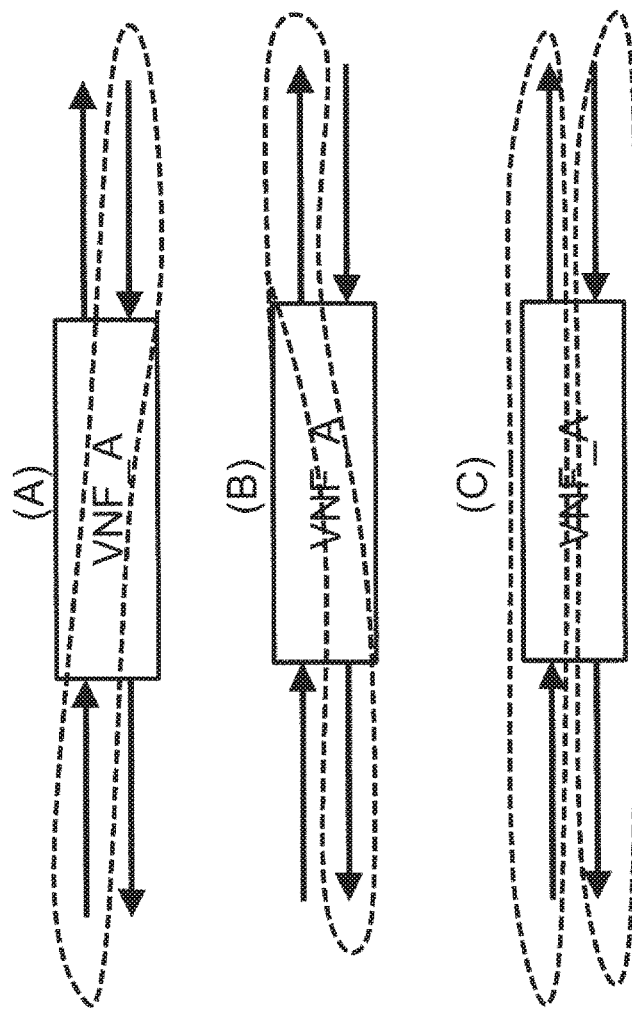

NETWORK MANAGEMENT METHOD AND APPARATUS

CROSS-REFERENCE TO RELATED PATENT APPLICATIONS

This application is a National Stage Entry of International Application No. PCT/JP2015/000527, filed Feb. 5, 2015, which claims priority from Japanese Patent Application No. 2014-020977, filed Feb. 6, 2014. The entire contents of the above-referenced applications are expressly incorporated herein by reference.

TECHNICAL FIELD

The present invention relates to a network system including virtual network functions, and more particularly to a network management method and apparatus.

BACKGROUND ART

In current communication systems, various network functions (NFs) such as BRAS (Broadband Remote Access Server), NAT (Network Address Translation), router and firewall are implemented by dedicated hardware equipment (appliances). Therefore, when a network operator launches a new communication service, the network operator is forced to introduce new dedicated hardware equipment and requires a lot of costs such as purchase expenses, installation spaces and the like for the equipment. In the light of such circumstances, studies have been made in recent years on a technology (Network Function Virtualization) that uses software to virtually execute network functions, which have been executed by hardware equipment (NPL 1). As an example of communication service virtualization, PTL 1 discloses a method in which a plurality of virtual routers are constructed on a communication node apparatus, and resources for these virtual routers are dynamically allocated according to communication quality.

Moreover, another technology has been also studied in which a communication flow is forwarded over a communication path in which a plurality of virtual network functions (VNFs) are combined, thereby providing various communication services (Service Chaining) (for example, see NPL 2).

CITATION LIST

Patent Literature

[PTL 1]
Japanese Patent Application Unexamined Publication No. 2012-175418

Non Patent Literature

[NPL 1]
Network Functions Virtualization—Update White Paper, Oct. 15-17, 2013 at the "SDN and OpenFlow World Congress", Frankfurt-Germany (http://portal.etsi.org/NFV/NFV_White_Pater2.pdf)
[NPL 2]
"Interface to the Routing System (I2RS) for Service Chaining: Use Cases and Requirements", Internet Engineering Task Force I2RS working group Internet Draft (Jul. 15, 2013)

SUMMARY

Technical Problem

In virtualized network function environments, it is expected that traffic between VNFs on the data plane can be very heavy in comparison with that on an existing datacenter. It is conceivable that a node located at an edge of service chaining, in particular, has a significantly heavy traffic load. Accordingly, in service chaining, it is insufficient to take only virtual machine deployment into consideration, but it is necessary to consider both computing and networking resources.

However, any of the above-described PTL and NPLs only discloses the determination of deployment targets on which virtual machines are deployed and the determination of paths to be included in a service chain. In other words, the above-described background techniques only take consideration of VNF deployment but take no consideration of network performance (end-to-end bandwidth, end-to-end delay, end-to-end reliability). For example, PTL 1 discloses a technique to allocate resources for virtual routers within a communication node apparatus, but it is not to determine the deployment of virtual routers with consideration given to network performance, that is, the deployment of virtual routers on a network.

Accordingly, an object of the present invention is to provide a management method and apparatus which allows easy management of virtual network function deployment on a network.

Solution to Problem

A network management apparatus according to the present invention is a network management apparatus for managing a network that includes a plurality of nodes and servers, characterized by comprising: means for generating an extended topology in which a virtual network function that can be deployed on a server is added as an extended node to a topology of the network; and control means that causes a display means to display an optimum path in the extended topology when a requirement of at least one virtual network function and endpoint nodes involved in the requirement are input through an input means, wherein the optimum path is obtained based on network resource information of the network and computing resource information of servers on which the at least one virtual network function can be deployed.

A network management method according to the present invention is a network management method for managing a network that includes a plurality of nodes and servers, characterized by comprising: generating an extended topology in which a virtual network function that can be deployed on a server is added as an extended node to a topology of the network; and displaying an optimum path in the extended topology on display means when a requirement of at least one virtual network function and endpoint nodes involved in the requirement are input through an input means, wherein the optimum path is obtained based on network resource information of the network and computing resource information of servers on which the at least one virtual network function can be deployed.

Advantageous Effects of Invention

According to the present invention, the deployment of a virtual network function on a server and the configuration of a network path are displayed as an optimum path on an extended topology, allowing easy management of the deployment of virtual network functions on a network.

BRIEF DESCRIPTION OF DRAWINGS

FIG. 5 is a diagram showing an example of the data structure of a database provided to the control apparatus according to the first exemplary embodiment.

FIG. 6 is a flowchart showing schematic operation of the control apparatus according to the first exemplary embodiment.

FIG. 7 is a block diagram showing the schematic configuration of a control apparatus according to a second exemplary embodiment of the present invention.

FIG. 8 is a schematic network architecture diagram showing a virtual link, for describing operation of the control apparatus according to the second exemplary embodiment.

FIG. 9 is a flowchart showing network path determination operation of the control apparatus according to the second exemplary embodiment.

FIG. 10 is a schematic network architecture diagram for describing physical link selection operation in FIG. 8.

FIG. 11 is a flowchart showing server selection operation and service chain path determination operation of the control apparatus according to the second exemplary embodiment.

FIG. 30 is a schematic network diagram for describing a VNF link constraint at the time of determining VNF deployment in FIG. 26.

DETAILED DESCRIPTION

A. Outline of Exemplary Embodiments

According to exemplary embodiments of the present invention, virtual network function (VNF) deployment and network path configuration are collectively performed, whereby it is possible to achieve optimum VNF deployment, taking consideration of the communication characteristics and communication performance of an underlay network. Hereinafter, an outline of exemplary embodiments of the present invention will be described with reference to a network system shown in FIG. 1.

Figure 1:
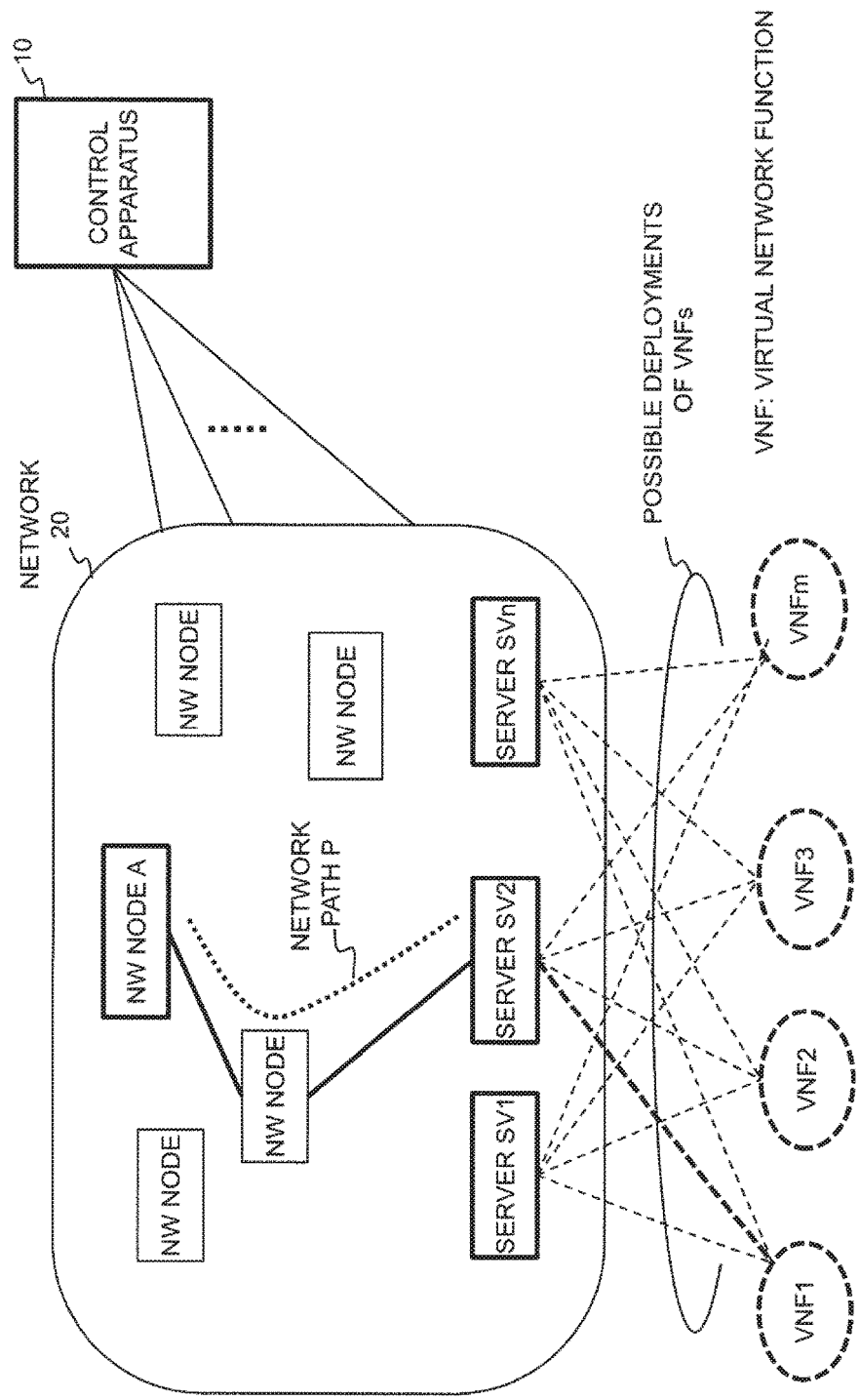
FIG. 1 is a system architecture diagram showing an example of a network on which an exemplary embodiment of the present invention is implemented.

Referring to FIG. 1, a control apparatus 10 controls a network 20 and performs VNF deployment and network path configuration collectively, which will be described later. The network 20 includes a plurality of NW (network) nodes and a plurality of servers SV1 to SVn, which are connected to their adjacent nodes or servers through physical links. Note that the control apparatus 10 may be provided within an operation and management apparatus of the network.

Each server can construct virtual machines (VMs) to run a plurality of virtual network functions VNF1 to VNFm, respectively. Here, it is assumed that each VNF can be deployed on the servers SV1 to SVn. In FIG. 1, a broken line mutually connecting each server SV and each VNF represents VNF deployability, and a set of such mutual connections is referred to as "possible deployments of VNFs". In the "possible deployments of VNFs", a server and a virtual machine deployed thereon are regarded as a component of a network topology, and information required to determine whether or not a virtual machine can be deployed (the available capacity and computing power of a server, requirements of a virtual machine, etc.) is related to each component. Thereby, mutual connections represented by the "possible deployments of VNFs" can be considered as an extension of the topology of the network 20. The use of this extended network topology makes it possible to collectively perform VNF deployment onto a server and network path configuration.

For example, in FIG. 1, a case will be considered, as an example, where it is intended to map a virtual link between the NW node A in the network 20 and the virtual network function VNF1 to an under-layer. In this example, an optimum path that fulfills the resources required of VNF1 can be collectively calculated by using possible paths from the NW node A to each server SV (network resource information) and mutual connections between each server SV and VNF1 (computing resource information for deploying the VNF1 onto each server). FIG. 1 illustrates, as an optimum solution, a network path P between the NW node A and the server SV2 and the server SV2 as the deployment target on which VFN1 is deployed. It is needless to say that, if conditions change due to changes in the state of the under-layer network, the computing power of a server SV and the like, another network path and/or another server that best match the requirements of the virtual link and VNF1 can be an optimum solution.

Note that if a communication path is configured between two nodes via a plurality of concatenated VNFs, it is only necessary to segment this communication path and apply the above-described procedure sequentially. For example, the above-described procedure is applied between one of the NW nodes and a first VNF, then applied between the first VNF and a next VNF, and then between the next VNF and a further next VNF, and lastly between the last VNF and the other NW node.

B. Service Chain

Hereinafter, a service chain in the exemplary embodiment of the present invention will be described with reference to a network architecture shown in FIG. 2 so as to simplify the description.

Figure 2:
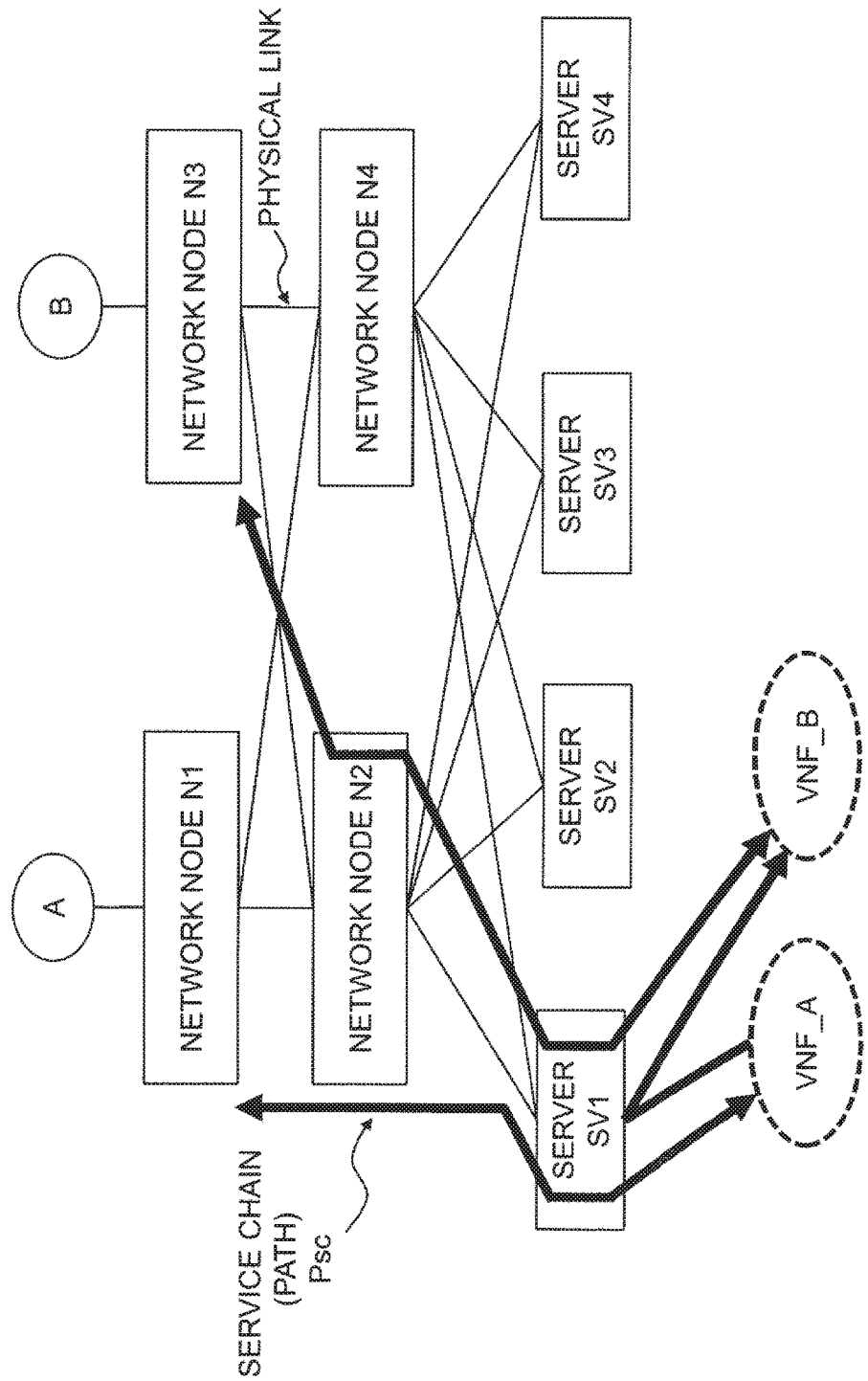
FIG. 2 is a schematic network diagram showing an example of a service chain in the network system according to the exemplary embodiment of the present invention.

Referring to FIG. 2, it is assumed that network nodes N1 to N4 are mutually connected through physical links, and each of the network nodes N2 and N4 is connected to servers SV1 to SV4 through physical links. Two virtual network functions VNF_A and VNF_B can be deployed on each server. Note that the network nodes N1 to N4 and servers SV1 to SV4 configure a virtual link as described above based on control from the control apparatus 10 (not shown). Hereinafter, an arbitrary one of the nodes N1 to N4 and an arbitrary one of the servers SV1 to SV4 will be simply referred to as "node N" and "server SV", respectively, as appropriate.

A service chain Psc shown in FIG. 2 includes: a virtual link from the network node N1 to the virtual network function VNF_A passing via the network node N2 and server SV1; a virtual link from VNF_A to VNF_B passing via the server SV1; and a virtual link from VNF_B to the network node N3 passing via the server SV1 and network node N2, as indicated by thick lines. Here, it is assumed that VNF_A and VNF_B are deployed on the server SV1.

A network path is defined as a set of physical links that constitute virtual links corresponding to a service chain Psc. That is, in FIG. 2, a set of physical paths passing the network node N1-network node N2-server SV1 and passing the server SV1-network node N2-network node N3 is a network path.

Hereinafter, exemplary embodiments of the present invention will be described specifically by using the service chain involving VNF_A and VNF_B shown in FIG. 2 as an example.

1. First Exemplary Embodiment

1.1) System Architecture

Figure 3:
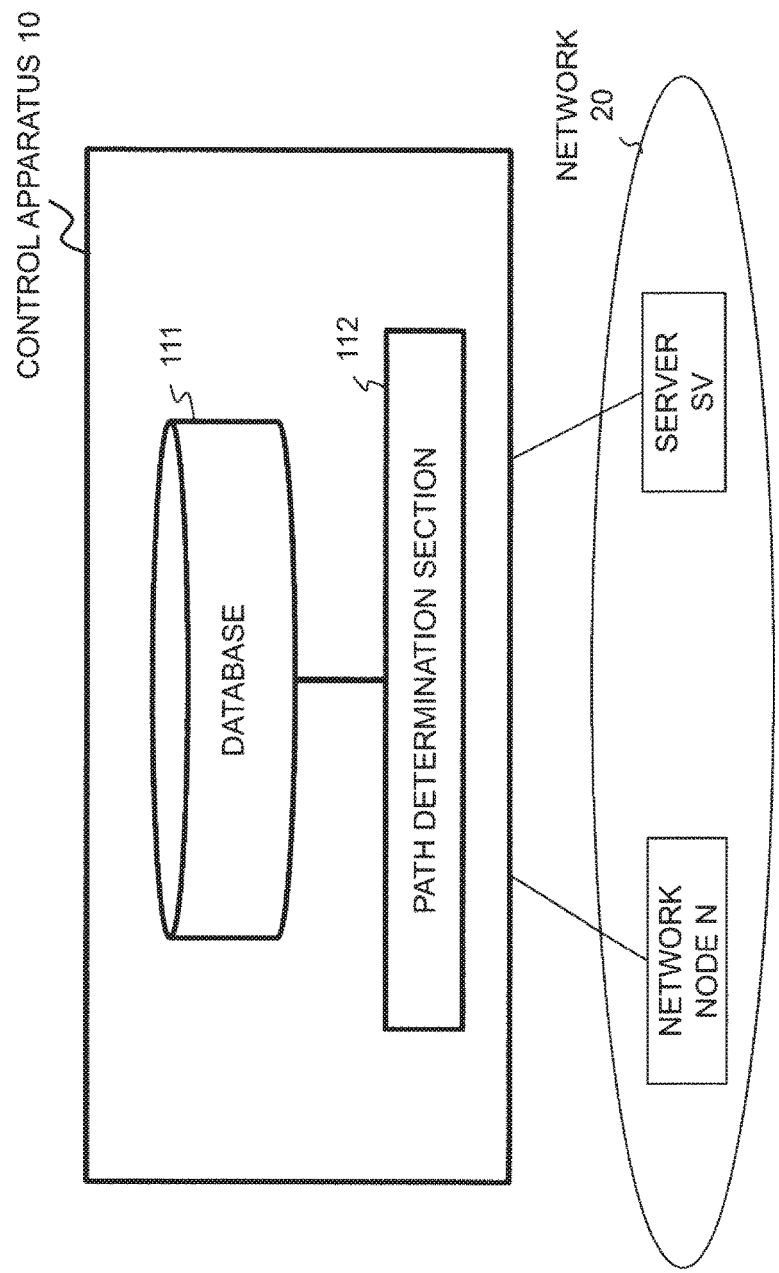
FIG. 3 is a block diagram showing the schematic configuration of a control apparatus according to a first exemplary embodiment of the present invention.

Referring to FIG. 3, a control apparatus 10 according to a first exemplary embodiment of the present invention includes a database 111 and a path determination section 112 and controls nodes N1 to N4 and servers SV1 to SV4 in a network 20. The path determination section 112 collectively performs VNF deployment onto servers and the configuration of a network path corresponding to a service chain. The database 111 includes information for the path determination section 112 to perform the above-described operation, which will be described later (see FIG. 5). Note that the control apparatus 10 has functions (not shown) of collecting under-mentioned information from the nodes, servers and the like in the network 20 and constructing the database 111.

Figure 4:
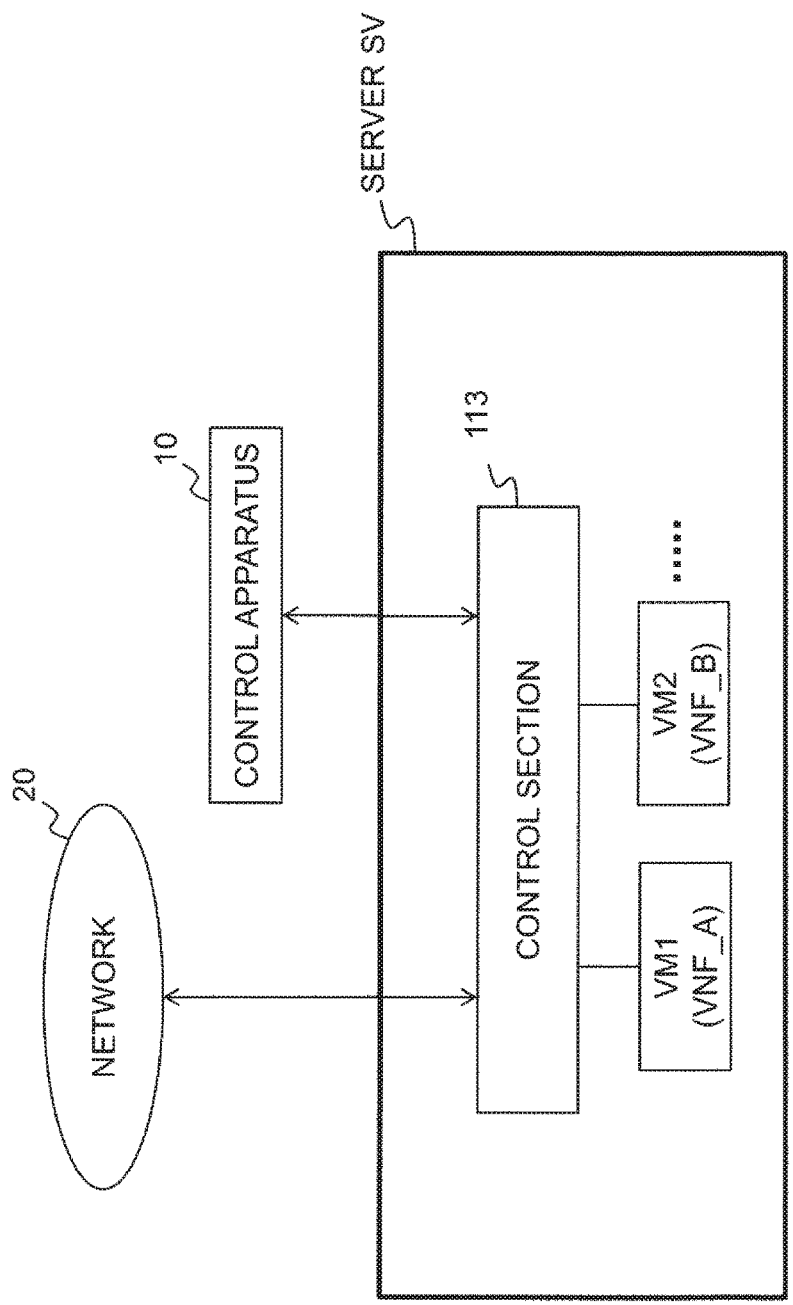
FIG. 4 is a block diagram showing the schematic configuration of a server in the first exemplary embodiment.

Referring to FIG. 4, in each server SV, it is possible to configure a plurality of virtual machines VM1, VM2, . . . that perform a plurality of VNFs, respectively. In the present exemplary embodiment, it is assumed that VNF_A and VNF_B can be deployed on two virtual machines VM1 and VM2, respectively. The operation of the virtual machines VM and the operation as a server are controlled by a control section 113.

Referring to FIG. 5, the information stored in the database 111 includes information about the components (links, switches and the like) of a network topology and parameters with respect to the components of the network topology. The parameters are used for the path determination section 112 to perform configuration of a network path corresponding to a service chain.

The database 111 in the present exemplary embodiment stores, as the components of a network topology, information related to the network (information about links and switches) and also information related to computing resources (information about the servers and virtual machines). The network topology is extended by representing a server and a virtual machine VM executing a VNF deployed on the server as a component of the network topology as described above, and further, parameters (CPU usage, conditions required of the VM and the like) required to determine virtual machine VM deployment are associated with the component, whereby it is possible to collectively perform virtual machine VM deployment and network path configuration.

1.2) Path Determination Operation

Referring to FIG. 6, the path determination section 112 of the control apparatus 10 refers to a first requirement related to a network and a second requirement related to computing resources (Operation S211). Here, the "first requirement" is a condition or conditions required of a network constituting a service chain and includes, for example, a required communication bandwidth and the like. The "second requirement" is a condition or conditions required of computing resources serving as a base for executing a virtual machine VM (VNF) and includes, for example, CPU/memory resources and the like required of a server.

Subsequently, the path determination section 112 refers to first parameters related to the network and second parameters related to computing resources by using the database 111 (Operation S212). Here, the "first parameters" are parameters associated with entities intrinsically included in a network, such as links, switches and the like, among the components of a network topology and specifically are an available bandwidth and the like. The "second parameters" are parameters associated with entities intrinsically related to computing, such as servers, virtual machines and the like, among the components of a network topology and specifically are CPU usage, required CPU power and the like.

Subsequently, the path determination section 112 determines a path (including VM deployment) for a service chain on the network that meets the above-described first and second requirements, based on the above-described first and second parameters (Operation S213).

1.3) Effects

As described above, according to the first exemplary embodiment of the present invention, based on the first parameters related to the network and second parameters related to computing, both virtual network function (VNF) deployment and network path configuration, i.e., virtual network function (VNF) deployment on the network can be collectively determined so as to fulfill requirements. Thus, it is possible to achieve optimum VNF deployment, taking consideration of the communication characteristics and communication performance of the underlay network.

2. Second Exemplary Embodiment

A control apparatus 10 according to a second exemplary embodiment of the present invention determines a path for a service chain on a network that fulfills requirements, based on a result of comparison related to network condition and a result of comparison related to computing condition. Hereinafter, the second exemplary embodiment will be described in detail with reference to FIGS. 7 to 12.

2.1) System Architecture

Referring to FIG. 7, the control apparatus 10 according to the second exemplary embodiment of the present invention includes a database 111 and a path determination section 122 and, as in the case of the first exemplary embodiment, further has functions of collecting information from network nodes and the like and constructing the database 111. The database 111 is similar to that of the first exemplary embodiment and stores information for the path determination section 122 to perform path determination operation as shown in FIG. 5. Note that a server SV has the configuration shown in FIG. 4 as in the first exemplary embodiment.

The path determination section 122 includes a network condition comparison section 122a and a computing condition comparison section 122b. The network condition comparison section 122a compares a network-related requirement (the "first requirement" in the first exemplary embodiment) and the parameters of network-related components and searches for a path that fulfills the requirement. The computing condition comparison section 122b compares a computing-related requirement (the "second requirement" in the first exemplary embodiment) and the parameters of computing-related components (servers) and searches for a component (a target on which a VM is deployed) that fulfills the requirement.

Note that the path determination section 122 of the control apparatus 10 can be also implemented by using a processor (CPU: Central Processing Unit) for executing path determination control programs, which will be described next, and storage devices such as a ROM (Read Only Memory) for storing the programs and a RAM (Random Access Memory) for storing information.

2.2) Path Determination Operation

Hereinafter, a description will be given of the path determination operation of the path determination section 122 including the network condition comparison section 122a and computing condition comparison section 122b.

Referring to FIG. 8, when creating a service chain, the path determination section 122 first sets a virtual link, of which only the start point (source) and the end point (destination) are determined, along with requirements. That is, a virtual link VL that includes the network node N1 as its source and the virtual network function VNF_A as its destination is set, and physical links that actually pass between the source and destination is set as "Don't Care". The virtual link VL may be set by an administrator or the like of the network, or may be set by the control apparatus itself.

<Network Condition Comparison>

Referring to FIG. 9, the network condition comparison section 122a refers to the above-described virtual link VL as the target on which a path for the service chain is to be configured (Operation S221), and selects candidates for physical links to constitute this virtual link VL (Operation S222). Subsequently, the network condition comparison section 122a selects physical links that meet the network requirement (required communication bandwidth and the like), from among the candidates for physical links (Operation S223).

First, in the network shown in FIG. 8, possible physical links (solid lines) starting from the source node N1 toward the destination VNF_A are selected as candidates for physical links (Operation S222).

Subsequently, physical links that meet the required network condition (required communication bandwidth and the like) are selected from among the candidates for physical links as shown in FIG. 10 (Operation S223). For example, assuming that, among possible communication paths starting from the source node N1 toward the destination VNF_A, those that meet the requirement are physical links PHYL1 and PHYL2/PHYL3 or physical links PHYL4 and PHYL5 as indicated by thick arrows, then these physical links are selected as physical links to constitute the virtual link VL. Note that links between the servers SV and VNFs, which are indicated by not solid lines but broken lines, mean that no physical links exist between the servers SV and VNFs in actuality, and that they are links of convenience to be used for collectively calculating VNF deployment and path configuration as described already.

Note that in the database 111 shown in FIG. 5, communication-related parameters such as communication bandwidth are associated with the physical links indicated by the solid lines or thick arrows in FIG. 10, and computing-related parameters such as CPU usage and required CPU/memory capacity are associated with the VNFs and servers SV.

<Computing Condition Comparison (1)>

Referring to FIG. 11, the computing condition comparison section 122b refers to the parameters and a computing requirement for a virtual machine VM to execute the VNF (Operation S224). Subsequently, the computing condition comparison section 122b compares the parameters and the computing requirement and selects a server SV that meets the computing requirement, from among server candidates, which are all servers SV on which this virtual machine is deployed (Operation S225). Based on the selected server SV that meets the computing requirement and the physical links (thick arrows in FIG. 10) selected by the above-described network condition comparison, a path (including VM deployment) for the service chain on the network is determined (Operation S226).

Figure 12:
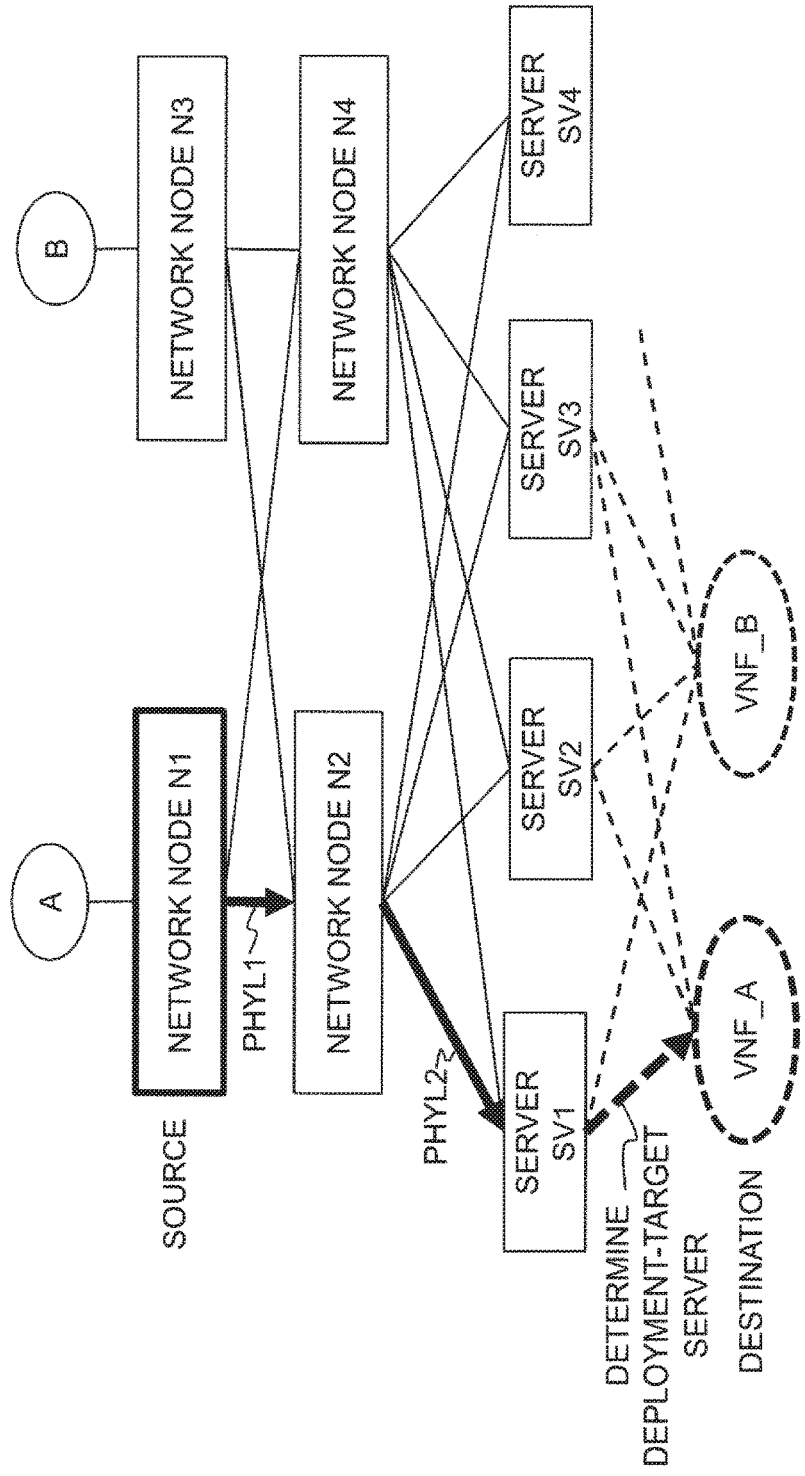
FIG. 12 is a schematic network architecture diagram for describing the server selection operation and service chain path determination operation in FIG. 11.

When it is determined through the above-described Operation S225 that the server SV1 is the target on which VNF_A is deployed as indicated by a thick broken arrow in FIG. 12, then, of the thick arrows in FIG. 10, a network path including the physical links PHYL1 and PHYL2 is determined.

<Computing Condition Comparison (2)>

In the above-described computing condition comparison (1), a round-robin method is employed in which a server that meets the condition is selected from among all server candidates on which VNF_A can be deployed, independently of the above-described network condition comparison operation. However, a selection method is not limited to such a round-robin method. For example, it is also possible that server candidates are limited to those servers SV that are connected to the physical links (thick arrows in FIG. 10) selected by the above-described network condition comparison, and a server SV that meets the computing requirement is selected from the limited server candidates. This method has the advantage that the use of a result of network condition comparison will reduce the number of servers against which the computing requirement is checked, in comparison with the case using the round-robin method.

2.3) Effects

As described above, according to the second exemplary embodiment of the present invention, as in the first exemplary embodiment, it is possible to achieve optimum VNF deployment, taking consideration of the communication characteristics and communication performance of the underlay network. That is, comparison between the network-related parameters and the network requirement and comparison between the computing-related parameters and the computing condition are performed, whereby both virtual network function (VNF) deployment and network path configuration, i.e., virtual network function (VNF) deployment on the network can be collectively determined. Further, according to the second exemplary embodiment, the use of a result of the network condition comparison makes it possible to reduce the computational load of the computing condition comparison.

3. Third Exemplary Embodiment

Figure 13:
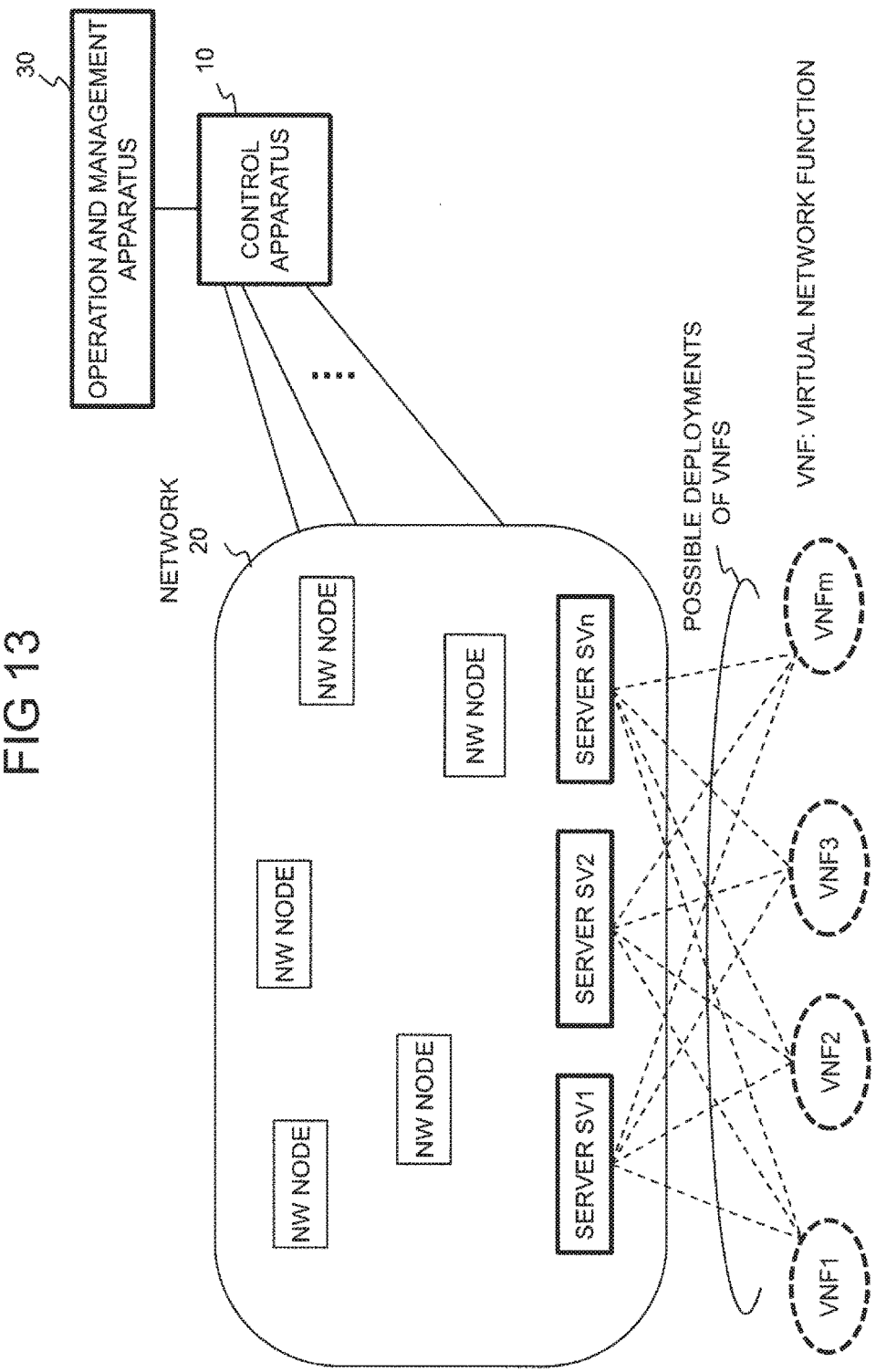
FIG. 13 is a system architecture diagram showing another example of a network on which an exemplary embodiment of the present invention is implemented.

Referring to FIG. 13, in a network system according to a third exemplary embodiment of the present invention, an operation and management apparatus 30 can display various settings on a control apparatus 10 and a determined communication path for a service chain. The other configurations and functions are similar to those of the above-described first or second exemplary embodiment, and therefore a description thereof will be omitted, using the same reference signs as in FIG. 1. Note that the control apparatus 10 may be provided within the operation and management apparatus 30.

3.1) Operation and Management Apparatus

Figure 14:
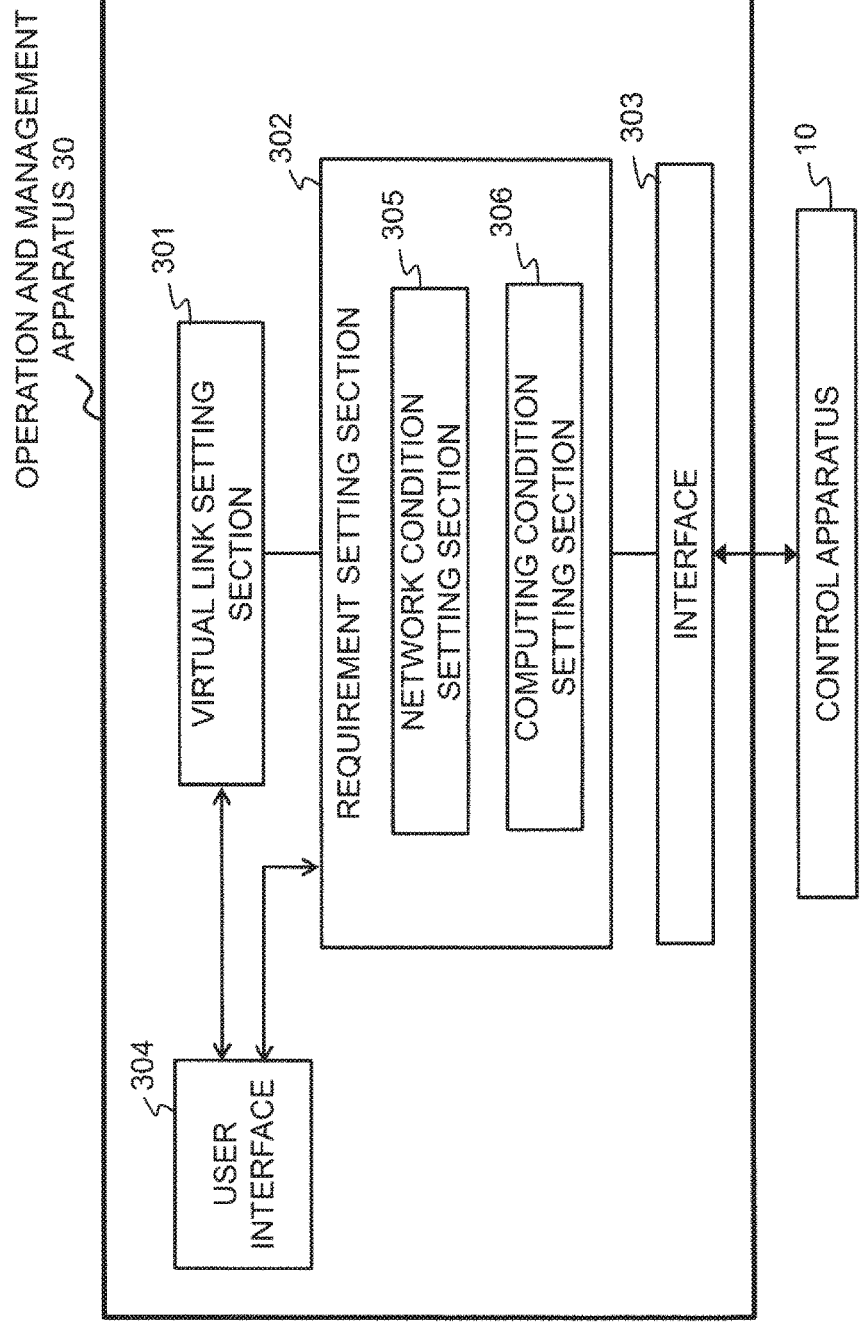
FIG. 14 is a block diagram showing the schematic configuration of an operation and management apparatus according to a third exemplary embodiment of the present invention.

Referring to FIG. 14, the operation and management apparatus 30 includes a virtual link setting section 301, a requirement setting section 302, an interface 303 and a user interface 304 and, apart from them, also includes a control section and a storage section (not shown). The user interface 304 includes an information input section such as a keyboard and an information display section such as a monitor, enabling an operation administrator to set virtual links and requirements, and also enabling the visualization of VNF deployment and paths on the network determined by the control apparatus 10, and the like.

The virtual link setting section 301 generates a virtual link from a service chain, which is input by the operation administrator via the user interface 304. The requirement setting section 302 includes a network condition setting section 305 and a computing condition setting section 306 and generates conditions required (network requirement and computing requirement) when the service chain is configured based on the inputs entered by the operation administrator. As described in the second exemplary embodiment, the network requirement is a condition or conditions and the like required of the network phase (e.g., required communication bandwidth) for the service chain, and the computing requirement is a condition or conditions and the like required of computing resources (e.g., required CPU/memory capacity) for the service chain. Hereinafter, a description will be given of operation of the operation and management apparatus according to the present exemplary embodiment, with reference to FIGS. 15 and 16.

3.2) Visualization of VNF Deployment on a Network

Figure 15:
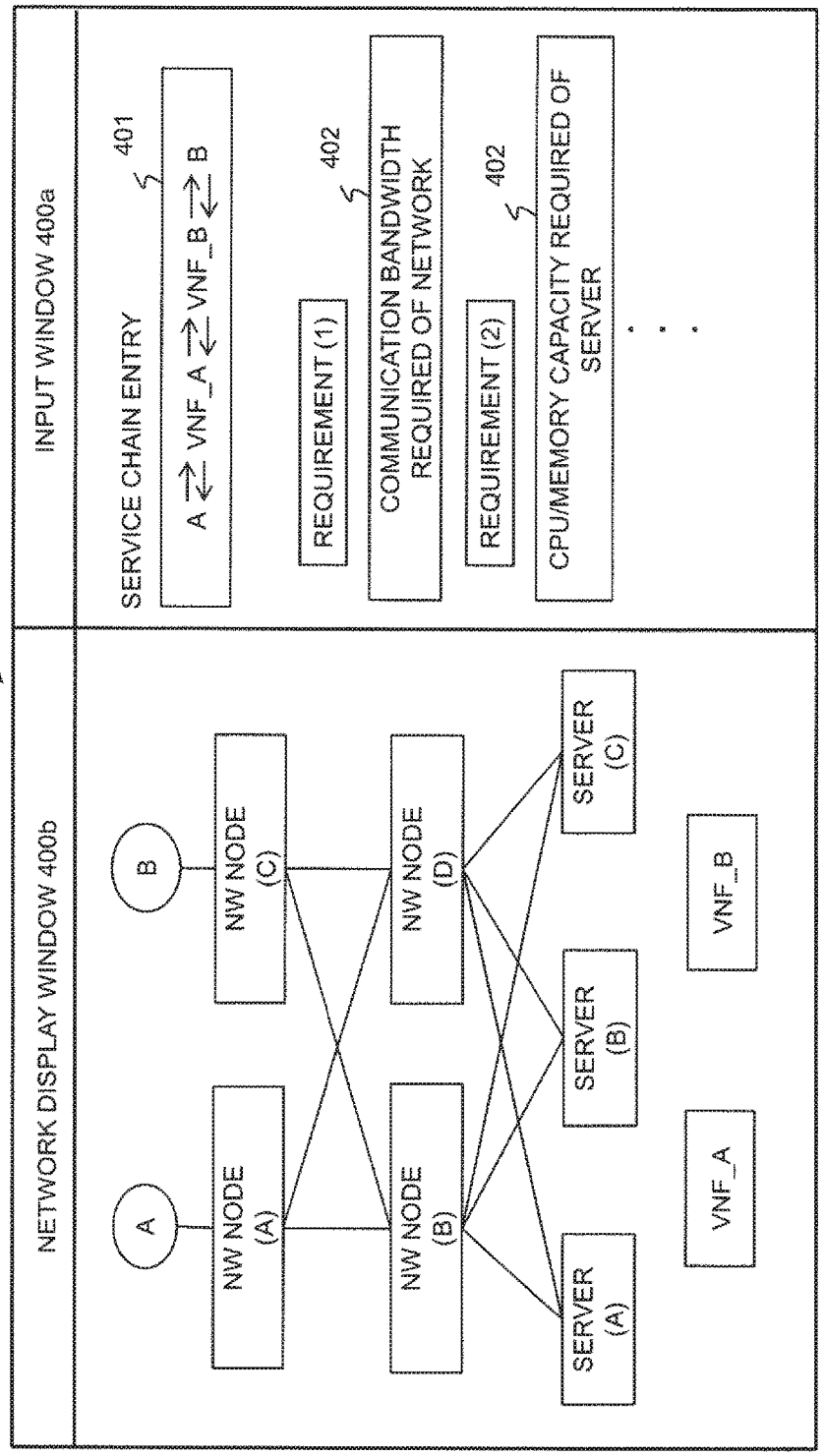
FIG. 15 is a diagram schematically showing a display screen, which is an example of the visualization of a network by the operation and management apparatus in the third exemplary embodiment.

As illustrated in FIG. 15, an operation and management screen 400 displayed on the user interface 304 is split into an input window 400a and a network display window 400b. A service chain entry field 401 and a plurality of requirement entry fields 402 are displayed on the input window 400a, whereas the physical topology of a network, which is the target of operation and management, is displayed on the network display window 400b. For example, the operation and management apparatus 30 acquires topology information from the database 111 of the control apparatus 10 and displays the architecture of the network based on the acquired topology information.

Referring to FIG. 15, in the network topology illustrated in the network display window 400b, network nodes A, B, C and D are mutually connected through physical links, and each of the network nodes B and D is connected to servers A, B and C through physical links. Moreover, it is assumed that two virtual network functions VNF_A and VNF_B can be deployed on each server.

It is assumed that the operation administrator has entered the following service chain in the service chain entry field 401 via the user interface 304 as shown in FIG. 15: A ↔ VNF_A ↔ VNF_B ↔ B.

When this service chain is entered, the virtual link setting section 301 generates virtual link information VL1, VL2 and VL3 as follows in order to implement this service chain.
VL1: Source=NW node (A); Destination=VNF_A
VL2: Source=VNF_A; Destination=VNF_B
VL3: Source=VNF_B; Destination=NW node (C)

Moreover, when a communication bandwidth required of the network and a CPU/memory capacity required of a server are entered in the requirement entry fields 402, the requirement setting section 302 generates a network requirement and a computing requirement and sends them, along with the above-described virtual link information (VL1, VL2 and VL3), to the control apparatus 10 for setting.

The control apparatus 10 calculates an optimum path for each of the virtual links VL1, VL2 and VL3 based on the virtual link information and requirement information set by the operation and management apparatus 30, as described in the first or second exemplary embodiment. A result of the calculation of an optimum path is sent to the nodes and servers in the network 20 and the operation and management apparatus 30.

Figure 16:
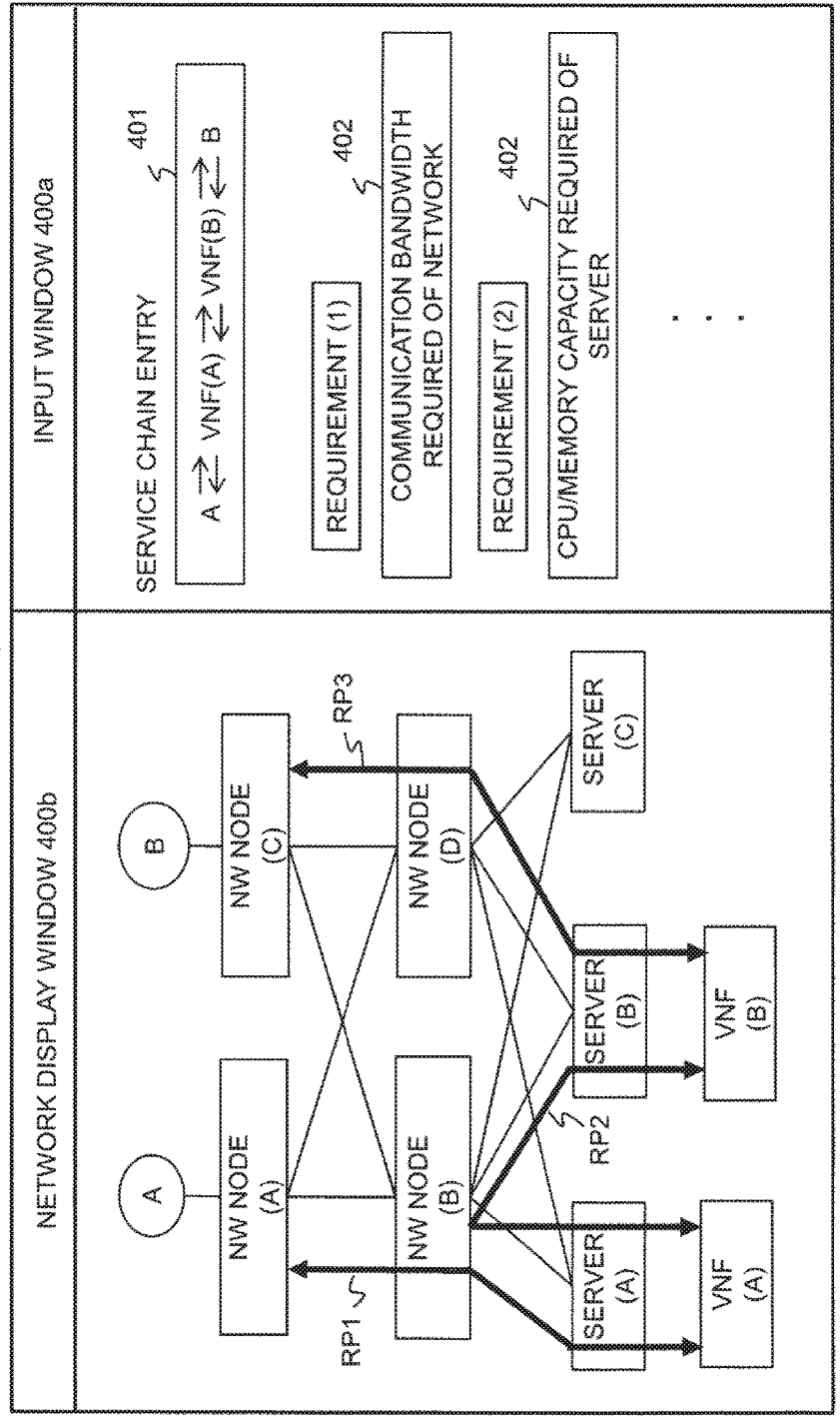
FIG. 16 is a diagram schematically showing a display screen, which is an example of the visualization of a service chain by the operation and management apparatus in the third exemplary embodiment.

As illustrated in FIG. 16, the user interface 304 of the operation and management apparatus 30 having received the optimum path information displays optimum paths RP1, RP2 and RP3 corresponding to the virtual links VL1, VL2 and VL3, respectively, in the network display window 400b on the operation and management screen 400. In this example, a network path configuring the virtual link VL1 is NW node (A)-NW node (B)-server (A); a network path configuring the virtual link VL2 is server (A)-NW node (B)-server (B); and a network path configuring the virtual link VL3 is server (B)-NW node (D)-NW node (C), and a target on which the virtual network function VNF_A is deployed is the server A, and a target on which the virtual network function VNF_B is deployed is the server B.

Note that the virtual link setting section 301 and requirement setting section 302 of the operation and management apparatus 30 can be also implemented by using a processor (CPU: Central Processing Unit) for executing operation and management programs as described above, and storage devices such as a ROM (Read Only Memory) for storing the programs and a RAM (Random Access Memory) for storing information.

3.3) Effects

As described above, according to the third exemplary embodiment of the present invention, the operation and management apparatus 30 can make various settings on the control apparatus 10, and based a service chain and requirements set by an operation administrator, it is possible to achieve optimum VNF deployment, taking consideration of the communication characteristics and communication performance of the underlay network, as in the first and second exemplary embodiments.

According to the third exemplary embodiment, in particular, the operation administrator can visually check VNF deployment on the network, which is calculated by the control apparatus 10, via the user interface, bringing the advantage that network operation and management is facilitated.

4. Fourth Exemplary Embodiment

Figure 17:
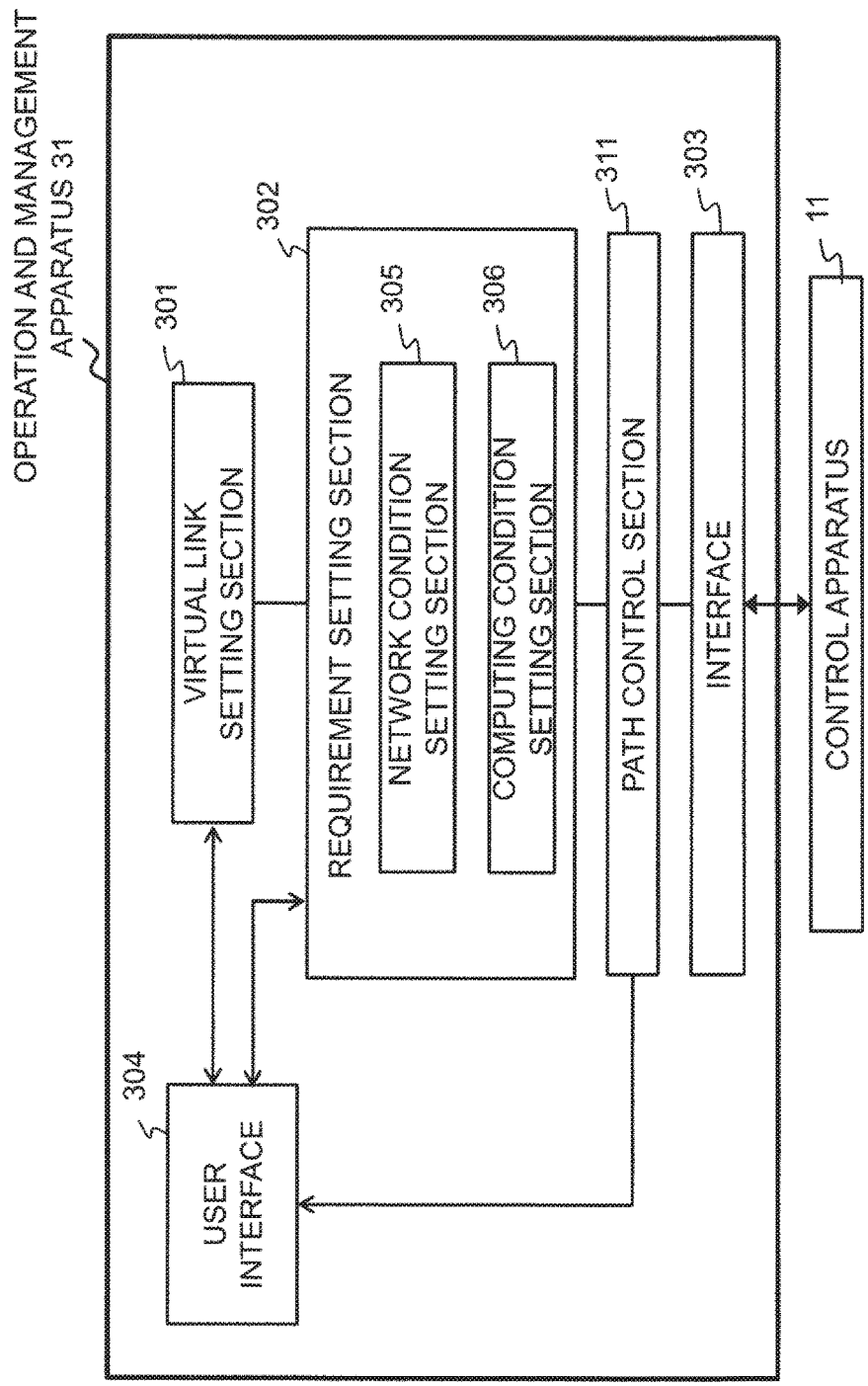
FIG. 17 is a block diagram showing the schematic configuration of an operation and management apparatus according to a fourth exemplary embodiment of the present invention.

As shown in FIG. 17, an operation and management apparatus 31 according to a fourth exemplary embodiment of the present invention has the configuration of the operation and management apparatus 30 according to the third exemplary embodiment to which a path control section 311 is additionally provided. Accordingly, blocks that are similar to those of the operation and management apparatus 30 are given the same reference sings, and a description thereof will be omitted.

Referring to FIG. 17, the path control section 311 uses virtual link information and requirement information set by the virtual link setting section 301 and requirement setting section 302, respectively, to compute optimum VNF deployment (path determination performed by the control apparatus 10) taking consideration of the communication characteristics and communication performance of an underlay network, as described above. A result of the computation of an optimum path is sent to a control apparatus 11 via the interface 303 and also transferred to the user interface 304.

Accordingly, the operation and management apparatus 31 according to the present exemplary embodiment displays the optimum path in the network display window 400b on the operation and management screen 400, as in the case of the third exemplary embodiment (see FIG. 16). Since path determination is performed by the path control section 311, the path determination sections 112 and 122 of the control apparatus 10 in the first to third exemplar embodiments are not necessary to the control apparatus 11 in the present exemplary embodiment.

As described above, the operation and management apparatus 31 according to the fourth exemplary embodiment of the present invention also has advantageous effects similar to those of the operation and management apparatus 30 according to the third exemplary embodiment described above. Further, since the operation and management apparatus 31 internally computes optimum VNF deployment on the network, it is possible for the operation administrator to check the physical links and VNF deployment included in a service chain before they are sent to the control apparatus 11, increasing the reliability of network operation and management. Moreover, as for the control apparatus 11, since path determination operation is not required, it is possible to simplify the configuration and to reduce power consumption.

5. Fifth Exemplary Embodiment

A control apparatus according to a fifth exemplary embodiment of the present invention determines a path for a service chain on a network in according with any of the above-described exemplary embodiments, and controls network nodes and servers so that a communication flow will be forwarded along this path. Hereinafter, the fifth exemplary embodiment will be described in detail with reference to FIGS. 18 to 22.

5.1) System Architecture

Figure 18:
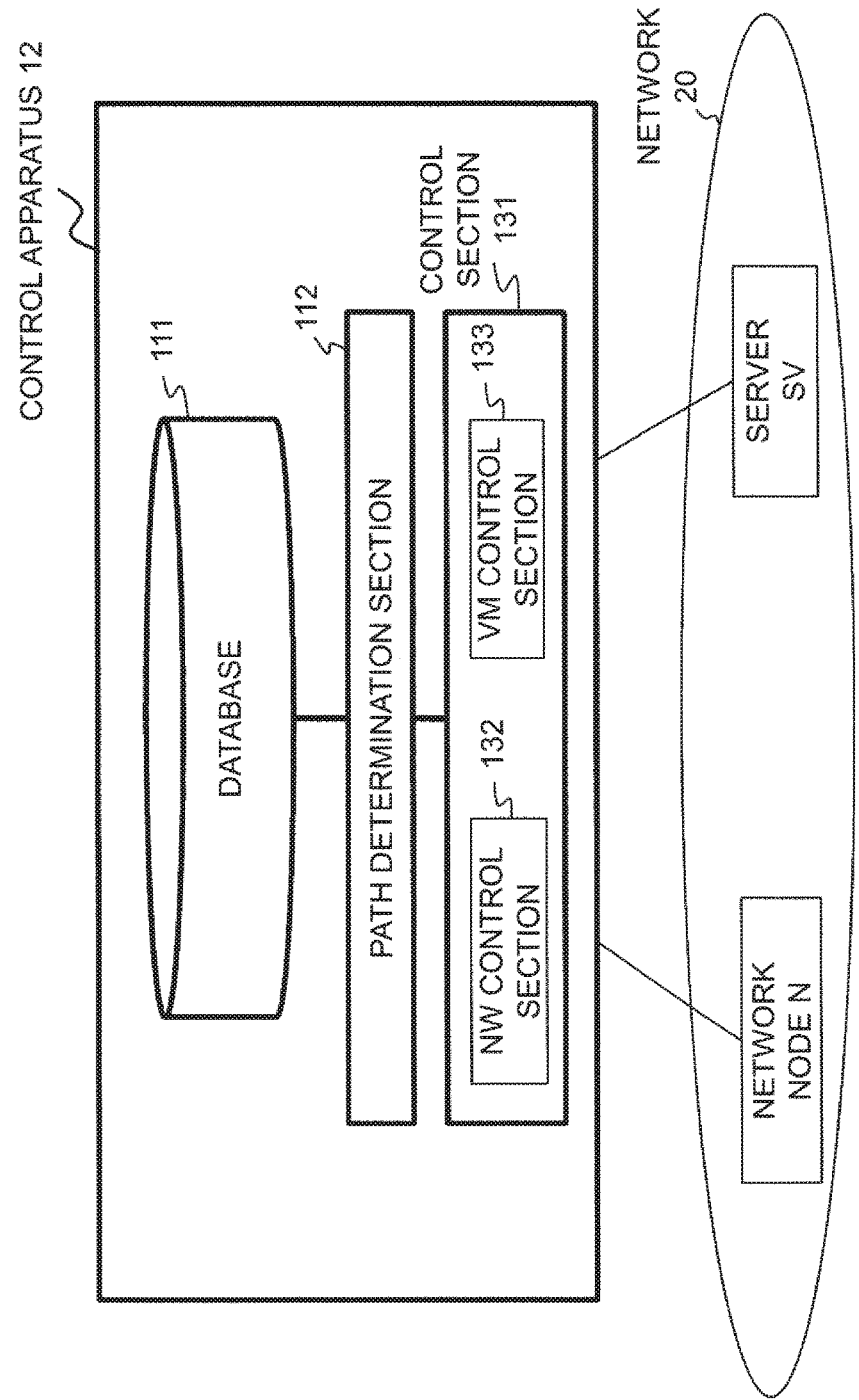
FIG. 18 is a block diagram showing the schematic configuration of a control apparatus according to a fifth exemplary embodiment of the present invention.

Referring to FIG. 18, a control apparatus 12 according to the fifth exemplary embodiment of the present invention includes a database 111, a path determination section 112 and a control section 131, and further includes functions of collecting information from network nodes and the like and of constructing the database 111 as in the first exemplary embodiment. The database 111 is similar to that of the first exemplary embodiment and stores information for the path determination section 112 to perform path determination operation as shown in FIG. 5. Note that it is also possible to use the path determination section 122 according to the second exemplary embodiment, in place of the path determination section 112. The control section 131 is functionally provided with a network control section 132 for controlling the nodes on a network 20 and a VM control section 133 for controlling data forwarding between virtual machines (VMs) within a server. The control section 131 controls network nodes N and servers SV so that a communication flow will be forwarded along a path determined by the path determination section 112.

Figure 19:
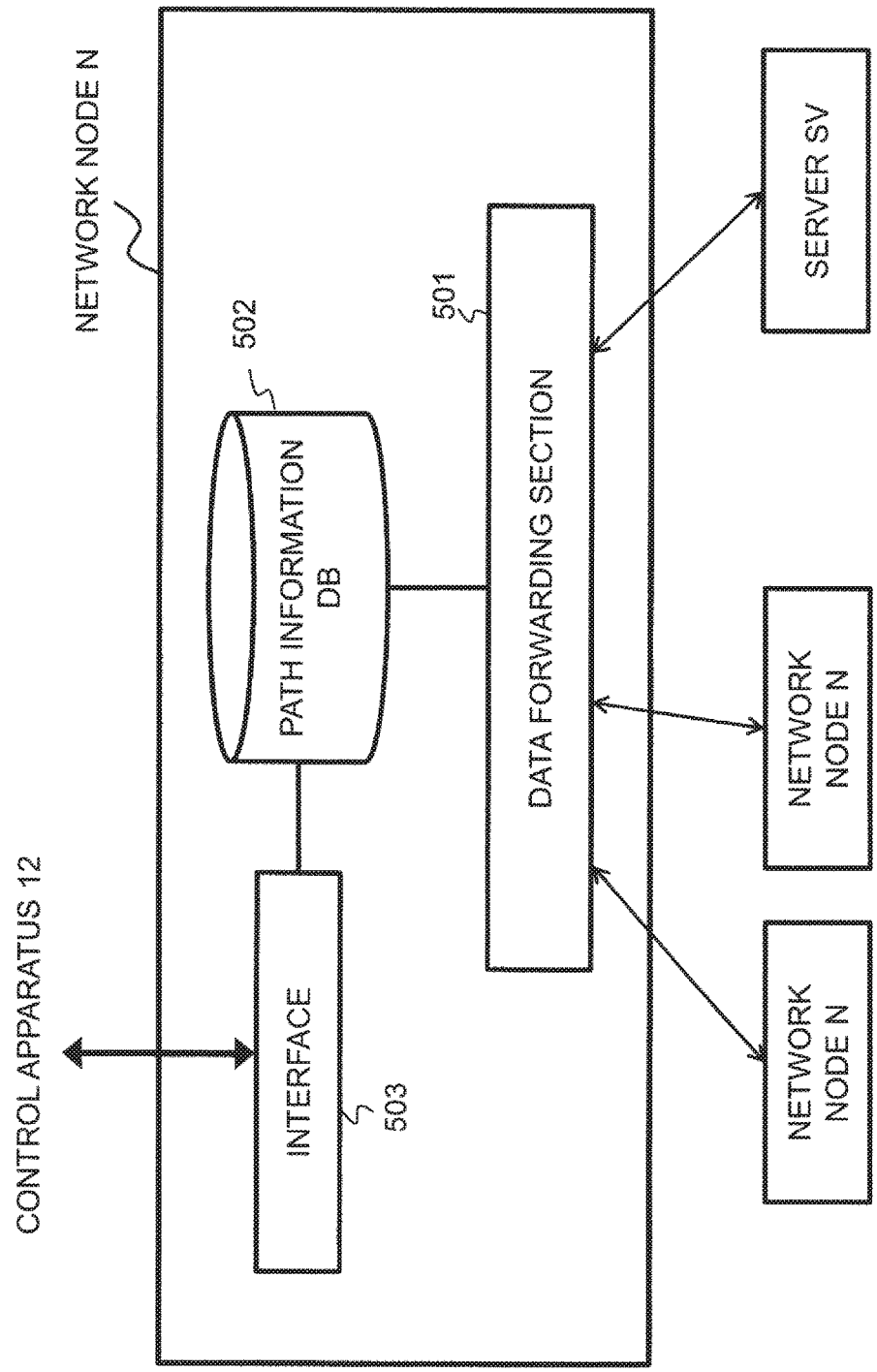
FIG. 19 is a block diagram showing the schematic configuration of a network node in the fifth exemplary embodiment.

Referring to FIG. 19, a network node N in the fifth exemplary embodiment includes a data forwarding section 501, a path information database 502 and an interface 503 for performing communication with the control apparatus 12. The network node N receives from the control apparatus 12 data including a condition for identifying a flow belonging to a service chain and a forwarding destination of a packet of this flow and stores the data in the path information database 502. The data forwarding section 501 identifies a packet of the flow belonging to the service chain in accordance with the condition and the forwarding destination information stored in the path information database 502 and forwards the packet to the corresponding forwarding destination (node or server).

Figure 20:
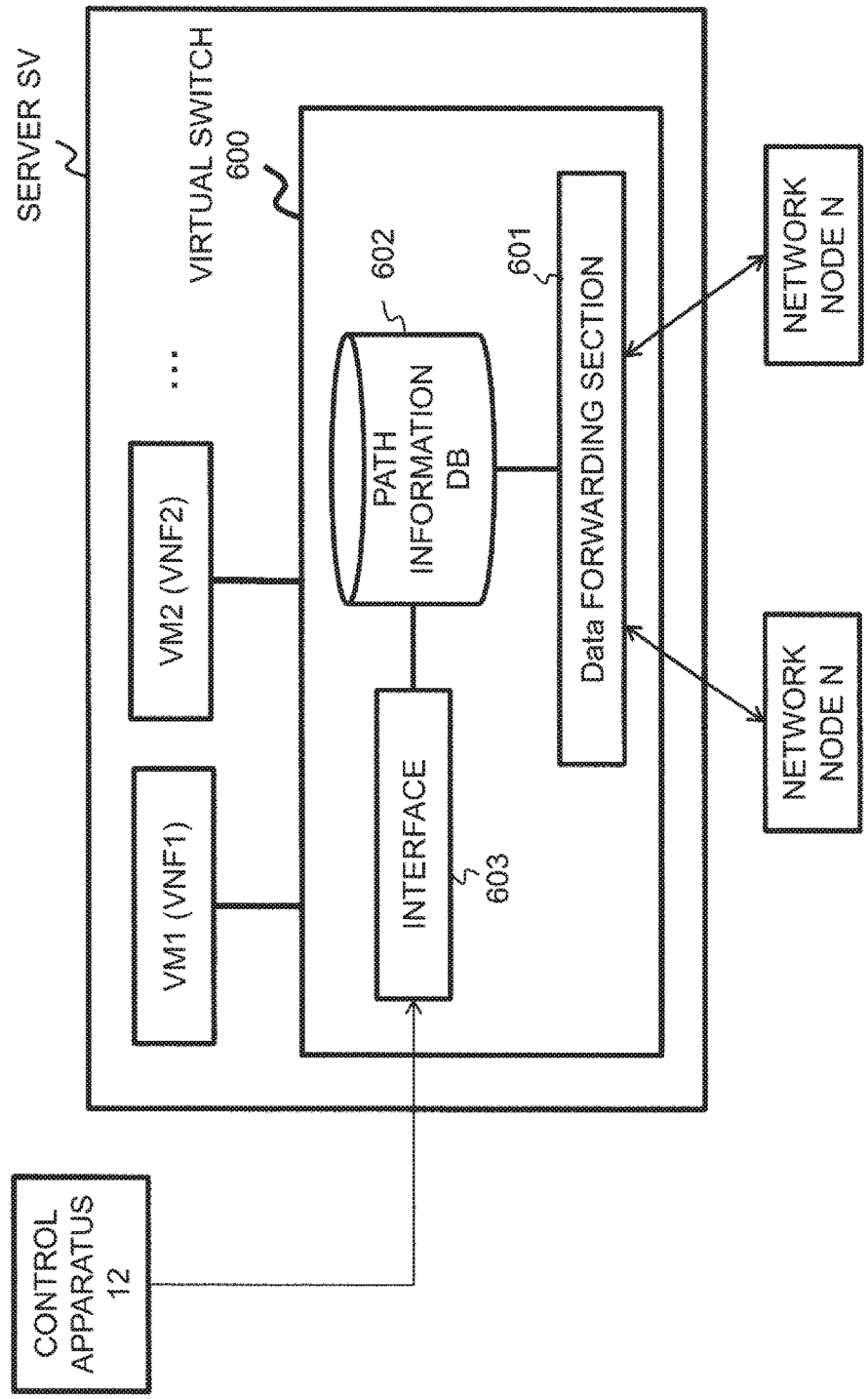
FIG. 20 is a block diagram showing the schematic configuration of a server in the fifth exemplary embodiment.

Referring to FIG. 20, a server SV in the fifth exemplary embodiment includes a plurality of virtual machines VM for performing a plurality of VNFs, respectively, and a virtual switch 600 for switching a communication flow between the plurality of virtual machines VM and adjacent network nodes.

The virtual switch 600 can be regarded as a network node in a network topology in the present exemplary embodiment, and includes a data forwarding section 601, a path information database 602 and an interface 603 for performing communication with the control apparatus 12. The virtual switch 600 receives from the control apparatus 12 data including a condition for identifying a flow belonging to a service chain and a forwarding destination of a packet of this flow and stores the data in the path information database 602. The data forwarding section 601 identifies whether or not a packet received from an adjacent network node N or one of the virtual machines VM is of the flow belonging to the service chain, in accordance with the condition and the forwarding destination information stored in the path information database 602, and forwards the packet to the corresponding forwarding destination (virtual machine VM or network node N). Accordingly, if packets are forwarded between virtual machines VM within a single server SV, it is possible to configure a service chain without forwarding the packets to external network nodes.

Note that the control apparatus 12, network nodes N and servers SV can be also implemented by using processors (CPU: Central Processing Unit) for executing programs for controlling the respective operations as described already, and storage devices such as ROMs (Read Only Memory) for storing the programs and RAMs (Random Access Memory) for storing information.

A centralized-control network architecture system, in which the control apparatus 12 sets information including a condition for identifying a flow belonging to a service chain and a forwarding destination of a packet of this flow as described above, can be implemented by using, for example, OpenFlow, I2RS (Interface to the Routing System), ForCES (Forwarding and Control Element Separation) or the like. Hereinafter, an example of implementation of the control apparatus 12 and network nodes N/servers SV will be illustrated that uses OpenFlow.

5.2) OpenFlow

In OpenFlow, a communication is recognized as an end-to-end flow, and routing, failure recovery, load balancing and the like are performed in units of flows. Here, a flow refers to, for example, a group of communication packets in series that have a predetermined property and, in the present exemplary embodiment, refers to a flow belonging to a configured service chain. Hereinafter, OpenFlow will be described by using a network shown in FIG. 21 as an example.

Figure 21:
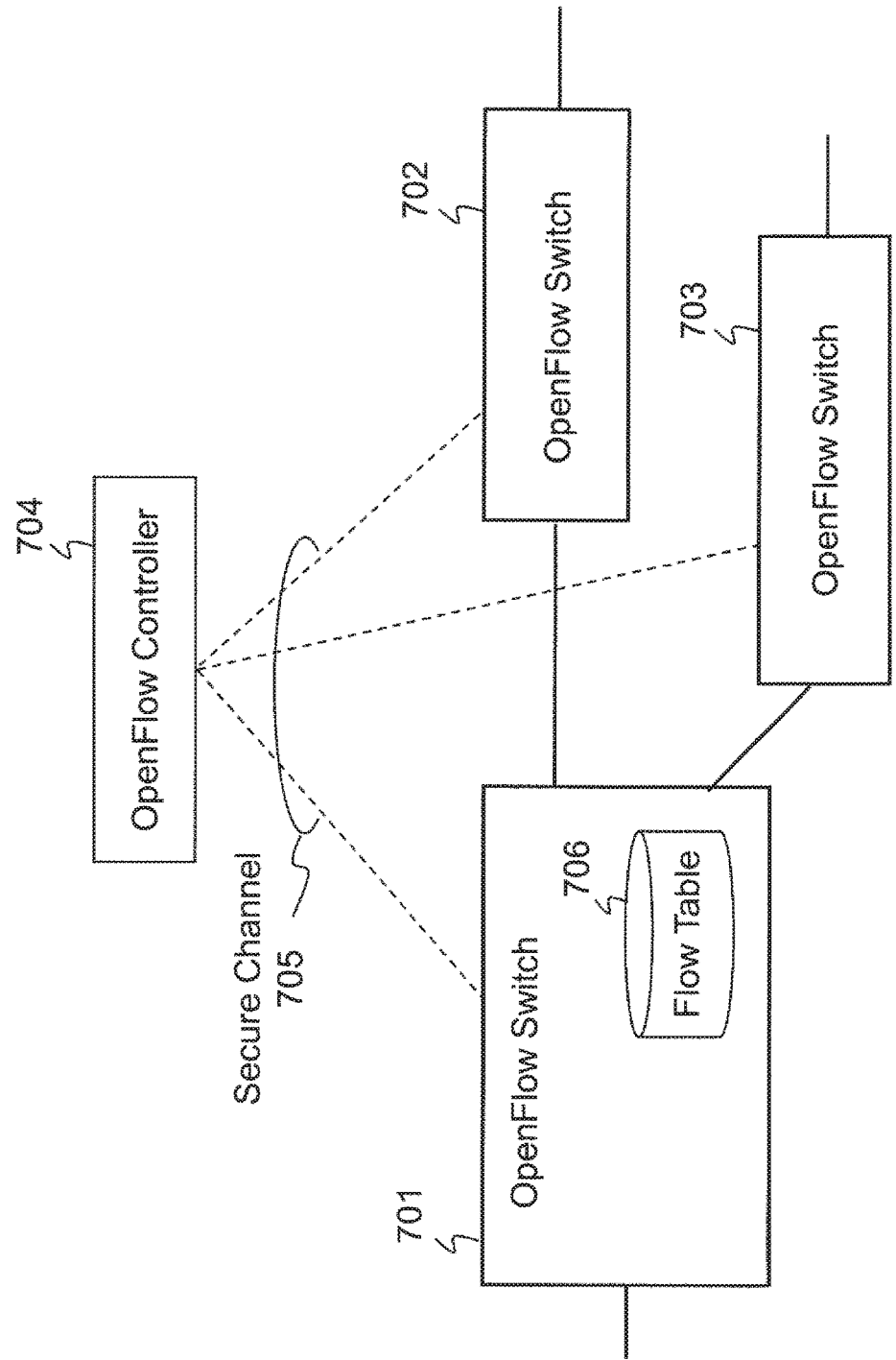
FIG. 21 is a schematic system architecture diagram for describing OpenFlow technology employed in the fifth exemplary embodiment.

Referring to FIG. 21, OpenFlow switches 701, 702 and 703 are network switches employing OpenFlow technology and, in the present exemplary embodiment, correspond to the network nodes N or the virtual switches 600 in the servers SV. An OpenFlow controller 704 is an information processing apparatus that controls the OpenFlow switches 701, 702 and 703 and, in the present exemplary embodiment, corresponds to the control apparatus 12.

A secure channel 705 is configured between each of the OpenFlow switches 701, 702 and 703 and the OpenFlow controller 704, and each OpenFlow switch communicates with the OpenFlow controller 704 through the secure channel 705. The OpenFlow controller 704 makes settings in a flow table 706 of each of the OpenFlow switches 701, 702 and 703 through the secure channel 705. Note that the secure channel 705 is a communication path between each of the OpenFlow switches 701, 702 and 703 and the controller 704 and is provided with measures for preventing communication tapping, manipulation and the like.

Figure 22:
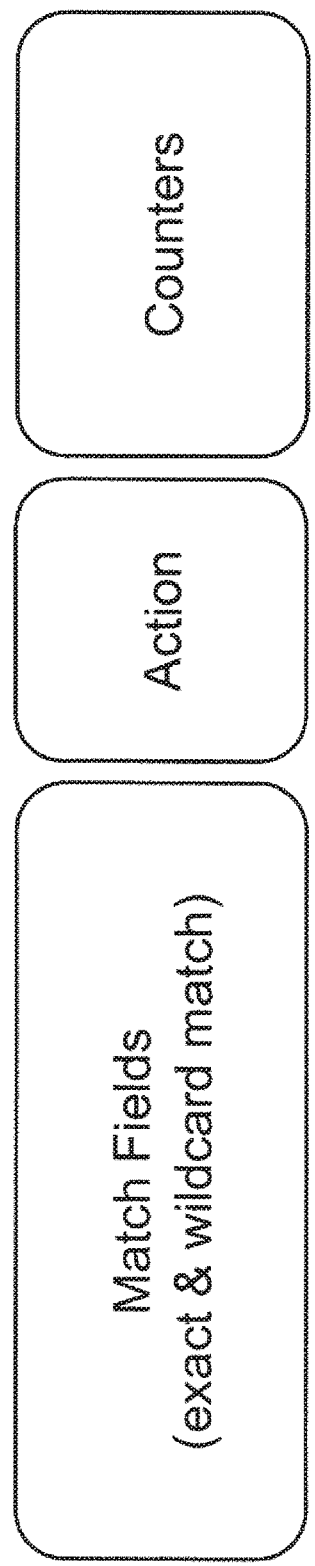
FIG. 22 is a format diagram schematically showing the structure of an entry stored in a flow table in FIG. 21.

FIG. 22 shows an example of the structure of each entry (flow entry) in the flow table 706 provided to each of the OpenFlow switches 701, 702 and 703. A flow entry includes fields (Match Fields) that define matching rules to be matched against information (e.g., a destination IP address, VLAN ID and the like) included in a header of a packet received by a switch, a field (Counters) that indicates statistical information of each packet flow, and a field (Action) that defines a method for processing a packet that matches the matching rules.

The OpenFlow switch 701/702/703 refers to the flow table 706 when it receives a packet. The OpenFlow switch 701/702/703 searches for a flow entry that matches the header information of the received packet. If an entry that matches the header information of the received packet is retrieved, the OpenFlow switch 701/702/703 processes the received packet in accordance with a processing method defined in the Action field of the retrieved entry. For the processing method, defined are, for example, "forward a received packet from a predetermined port," "discard a received packet," and "rewrite part of the header of a received packet and forward to a predetermined port."

If any entry that matches the header information of the received packet is not found, the OpenFlow switch 701/702/703, for example, forwards the received packet to the OpenFlow controller 704 through the secure channel 705 and requests the OpenFlow controller 704 to set a flow entry that defines a method for processing the received packet.

The OpenFlow controller 704 determines a method for processing the received packet and sets a flow entry including the determined processing method in the flow table 706. Thereafter, the OpenFlow switch 701/702/703 processes subsequent packets belonging to the same flow as the received packet, based on the set flow entry.

5.3) Effects

According to the fifth exemplary embodiment of the present invention, a path for a service chain is determined as in the cases of the first to fourth exemplary embodiments, and nodes and servers in the network are controlled so that a communication flow will be forwarded along this path. Accordingly, it is possible to achieve optimum VNF deployment, taking consideration of the communication characteristics and communication performance of the underlay network.

A plurality of virtual machines executing a plurality of VNFs, respectively, are configured within a server SV in such a manner that they can be switched by a virtual switch. This in particular makes it possible to control path switching at a network node and virtual machine switching in a server in equivalent manners, enabling collective control using, for example, OpenFlow technology.

6. Sixth Exemplary Embodiment

In service chaining, it is insufficient to only consider the deployment of virtual machines, but it is required to consider both computing and networking resources as described already. According to a sixth exemplary embodiment of the present invention, a network topology is extended so that it includes required VNFs and servers on which they can be deployed, and based on this extended topology, optimum virtual machine (VNF) deployment on a network is determined. This optimum solution to VNF deployment can be calculated by using, for example, Integer Programming.

Figure 23:
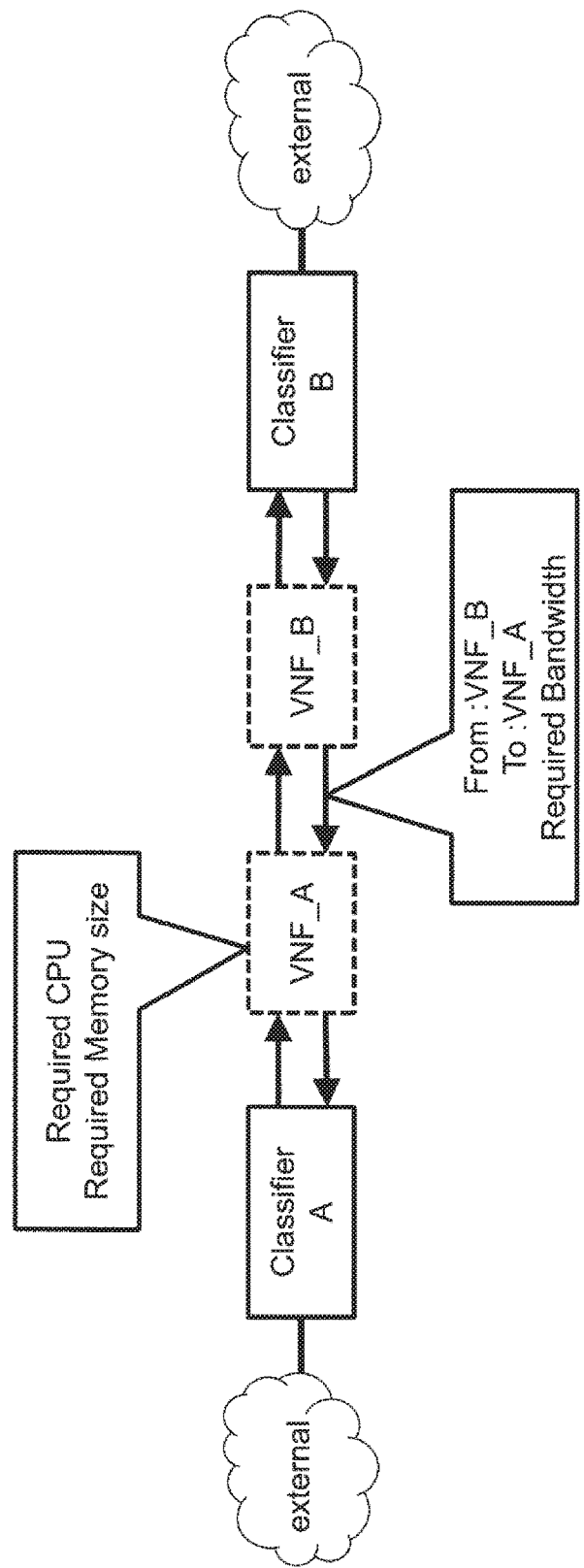
FIG. 23 is a diagram showing a network function forwarding graph, for describing a method for determining virtual network function deployment according to a sixth exemplary embodiment of the present invention.

First, as shown in FIG. 23, a forwarding graph will be considered that depicts a service chain including a combination of virtual network functions VNF_A and VNF_B between classifiers A and B. For VNFs to be combined, a required CPU power and memory size (computing requirements) are set, while for a virtual link, the source and destination and a required bandwidth (network requirements) are set. This forwarding graph corresponds to information entered in the above-described service chain entry field 401 and requirement entry fields 402 in FIG. 15.

Figure 24:
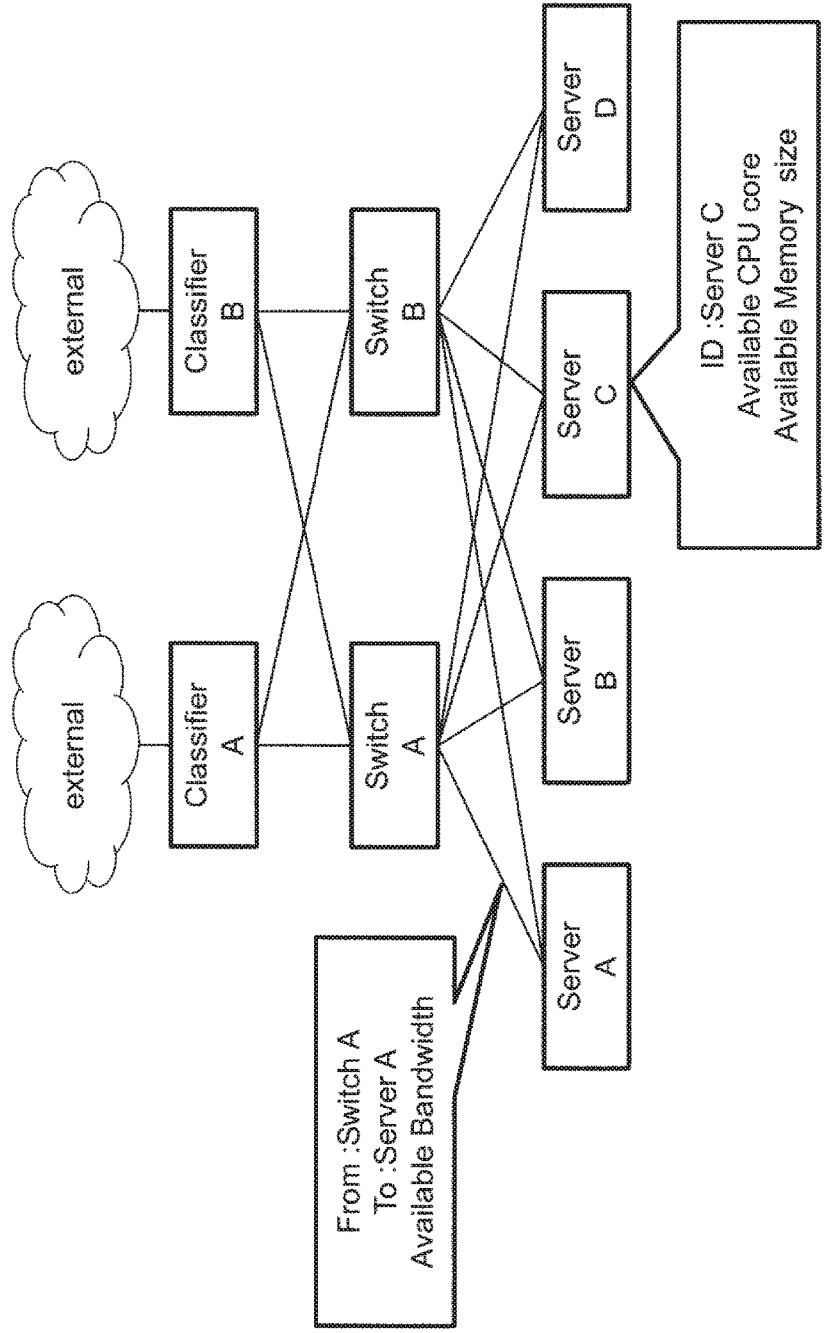
FIG. 24 is a network diagram showing an underlay network topology in the sixth exemplary embodiment.

FIG. 24 shows an underlay network topology for configuring virtual links for the above-mentioned forwarding graph. Each classifier and switches are mutually connected, and switches and each server are mutually connected, both through physical links. Each physical link has an available bandwidth (a network parameter). Moreover, each server has available CPU and memory sizes (computing parameters).

Figure 25:
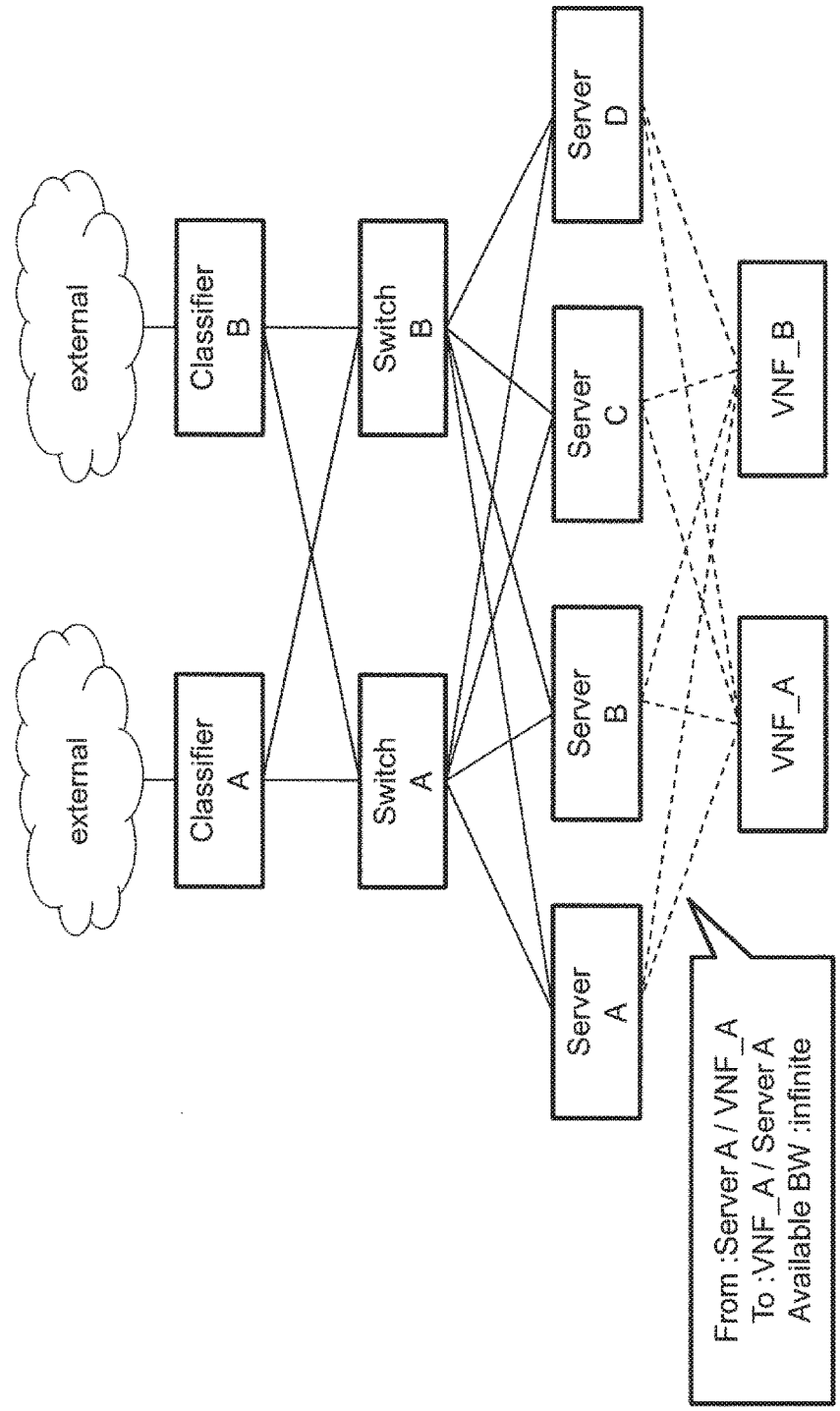
FIG. 25 is a network diagram showing an extended network topology in the sixth exemplary embodiment.

FIG. 25 shows an extended topology, which is the above-described underlay network topology with the addition of the possible deployments of VNF_A and VNF_B. A broken line mutually connecting a server and a VNF indicates that this server is a target on which this VNF can be deployed. The deployment of a service chain is determined by Integer Programming based on this extended topology.

Figure 26:
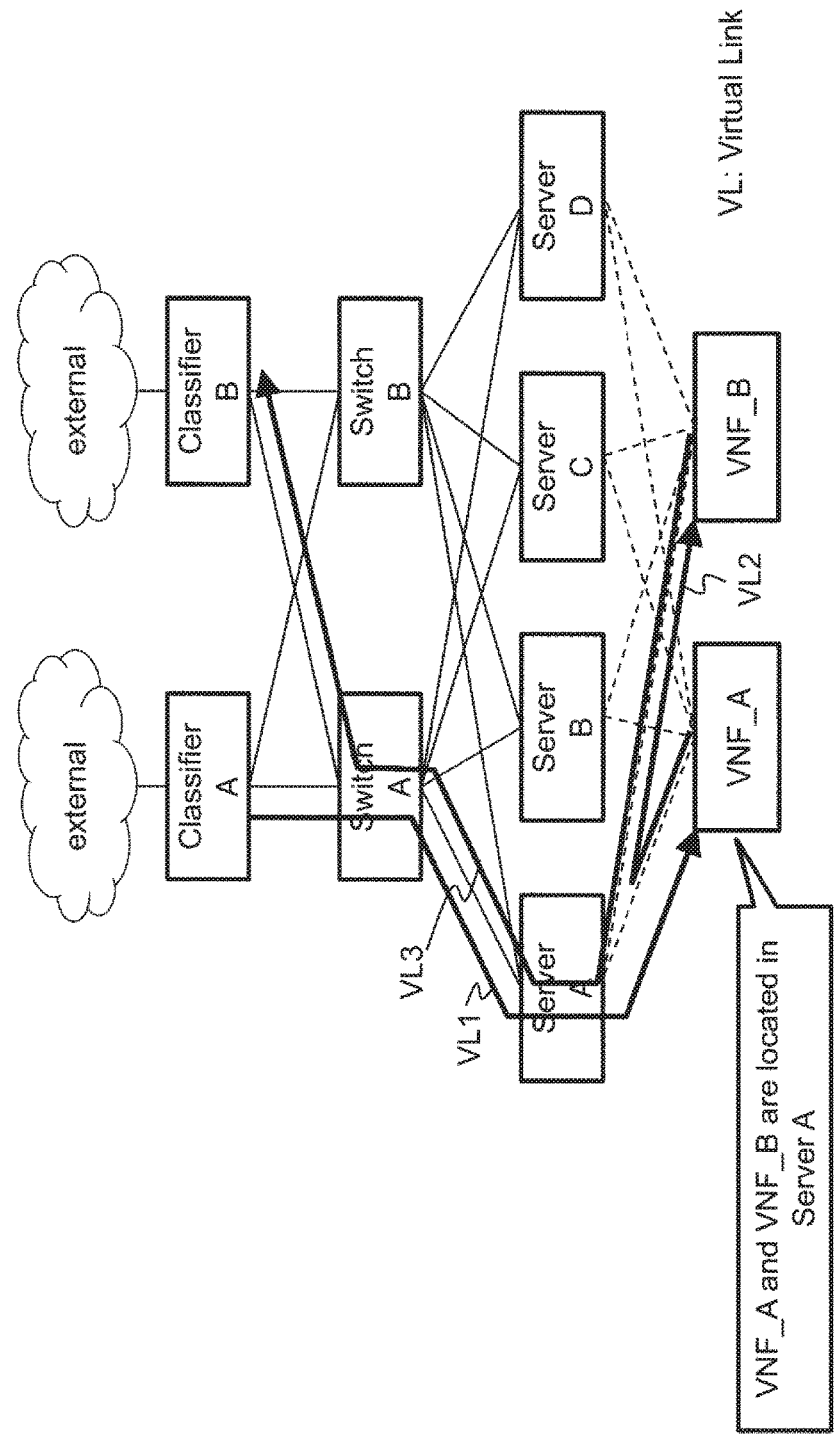
FIG. 26 is a network diagram showing VNF deployment for a service chain, using the extended network topology in the sixth exemplary embodiment.

FIG. 26 shows an optimum solution as an example when VNF_A and VNF_B are deployed on the server A. Here, for the NF forwarding graph: Classifier A ↔ VNF_A ↔ VNF_B ↔ Classifier B shown in FIG. 23, virtual links VL1, VL2 and VL3 are generated, as represented by thick arrows in FIG. 26.
VL1: Source=Classifier A; Destination=VNF_A
VL2: Source=VNF_A; Destination=VNF_B
VL3: Source=VNF_B; Destination=Classifier B

6.1) Determination of Optimum VNF Deployment

Hereinafter, a computational process will be shown that uses Integer Programming to determine optimum VNF deployment on the network as shown in FIG. 26. Definitions of variables are as follows.
VNF computing requirement: required_cpu$^x$ (x: vnf_id)
Virtual link (VL) network requirement: required_bw$^x$ (x: vl_id)
Network path (underlay path):
upath$^x_{ij}$∈{0,1} (x: vl_id, i, j: underlay_node_id), wherein upath$^x_{ij}$=1 when a virtual link x uses a link ij between physical nodes i and j.
Server computing parameter (available CPU): available_cpu$^s$ (s: server_id)
Link network parameter (available bandwidth): available_bw$_{ij}$ (i: from_id, j: to_id)

Calculate an optimum solution to VNF deployment by minimizing/maximizing an objective function C. An example of the objective function C is shown below:

$$C = \sum_x \sum_i \sum_j upath^x_{ij} \qquad \text{[Math. 1]}$$

In the case of this equation, a set of the physical links (upath$^x_{ij}$=1) that minimizes the objective function C is an optimum solution to VNF deployment in the present exemplary embodiment. At that time, the following constraints are taken into consideration: flow conservation law; bandwidth constraint; computing constraint; and VNF link constraint. Hereinafter, each of the constraints will be described with reference to FIGS. 27 to 33.

6.2) Flow Conservation Law

The flow conservation law is a condition for establishing a virtual link as a path, and needs to be fulfilled when each virtual link is mapped to the underlay. Hereinafter, a description will be given with reference to FIG. 27.

The difference between the amounts of transmission and reception data at nodes other than the source and destination must be 0, as expressed by the following equation:

$$\sum_j upath^x_{ij} - \sum_j upath^x_{ji} = 0 \qquad \text{[Math. 2]}$$

where ∀x,∀i∈ all nodes \{src$^x$,dst$^x$}.

Figure 27:
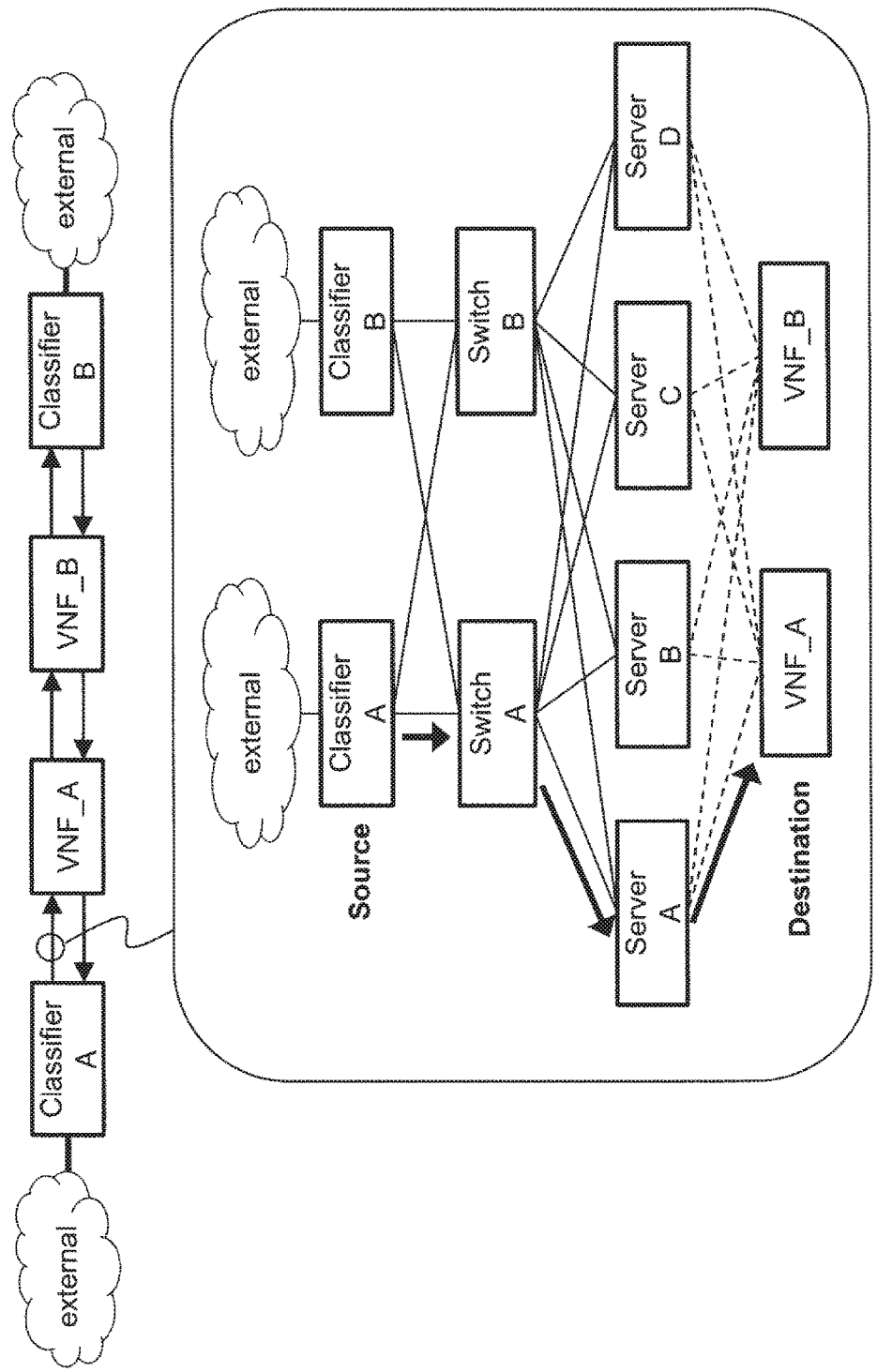
FIG. 27 is a schematic network diagram for describing a flow conservation law at the time of determining VNF deployment in FIG. 26.

In FIG. 27, "src$^x$" is the source (here, the classifier A) of a virtual link VL, and "dst$^x$" is the destination (here, VNF_A) of the virtual link VL.

The difference between the amounts of transmission and reception data at the source must be 1.

$$\sum_j upath^x_{src^x j} - \sum_j upath^x_{j src^x} = 1 \; (\forall x) \qquad \text{[Math. 3]}$$

The difference between the amounts of transmission and reception data at the destination must be −1.

$$\sum_j upath^x_{dst^x j} - \sum_j upath^x_{j dst^x} = -1 \; (\forall x) \qquad \text{[Math. 4]}$$

6.3) Bandwidth Constraint

The bandwidth constraint is a condition for accommodating a required bandwidth. When a virtual link VL is mapped to a link ij, the total amount of traffic going through this link ij must be able to be accommodated within the available bandwidth of this link ij. Accordingly, the following expression needs to be satisfied.

$$\sum_x upath^x_{ij} \cdot required\_bw^x \leq available\_bw_{ij} \; (\forall i, \forall j) \qquad \text{[Math. 5]}$$

Figure 28:
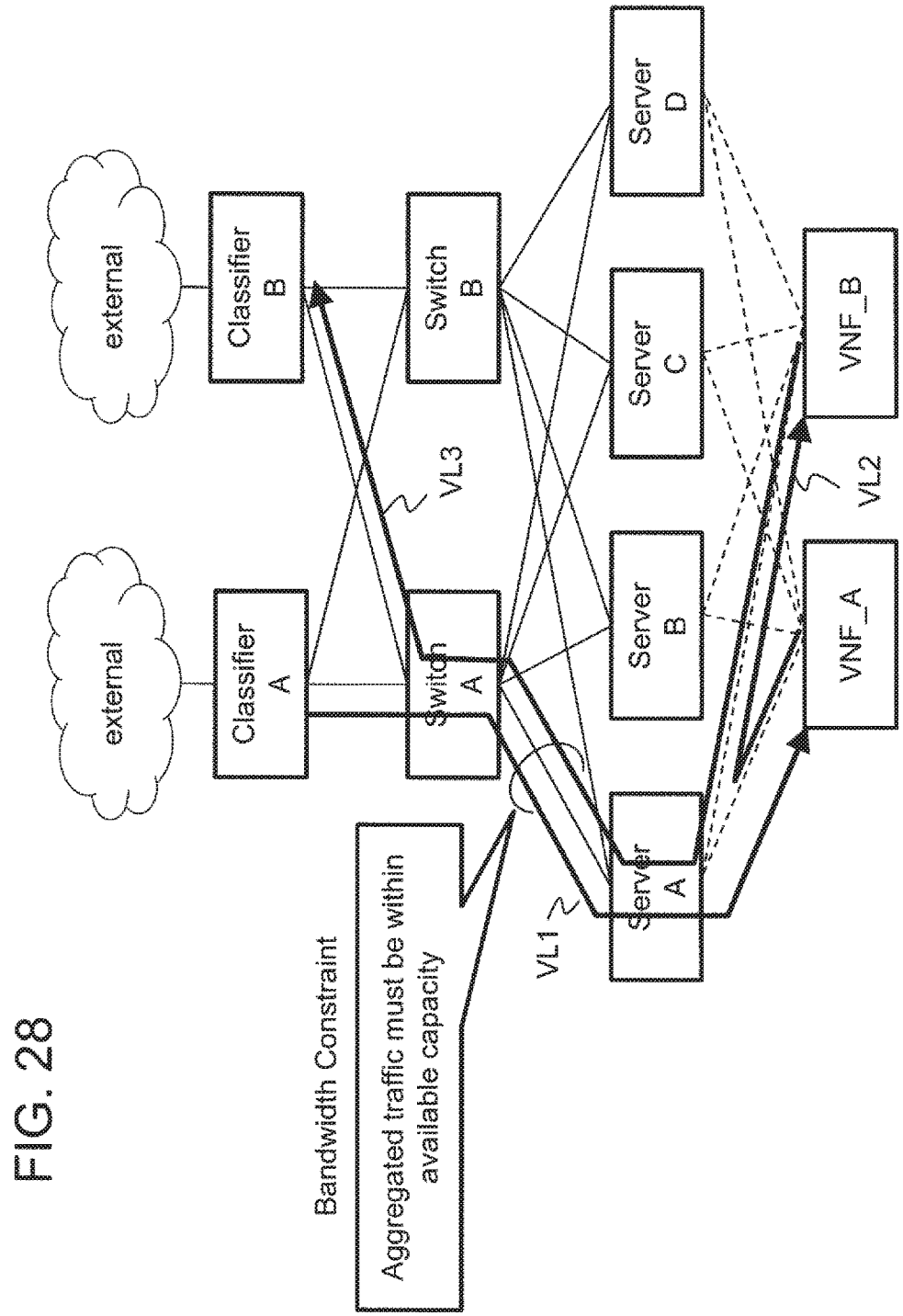
FIG. 28 is a schematic network diagram for describing a band constraint at the time of determining VNF deployment in FIG. 26.

For example, referring to FIG. 28, the virtual links VL1 and VL3 are mapped to the physical link between the switch A and the server A. Accordingly, the sum of the required bandwidth of the virtual link VL1 and the required bandwidth of the virtual link VL3 needs to be not larger than the available bandwidth of this physical link.

6.4) Computing Constraint

Figure 29:
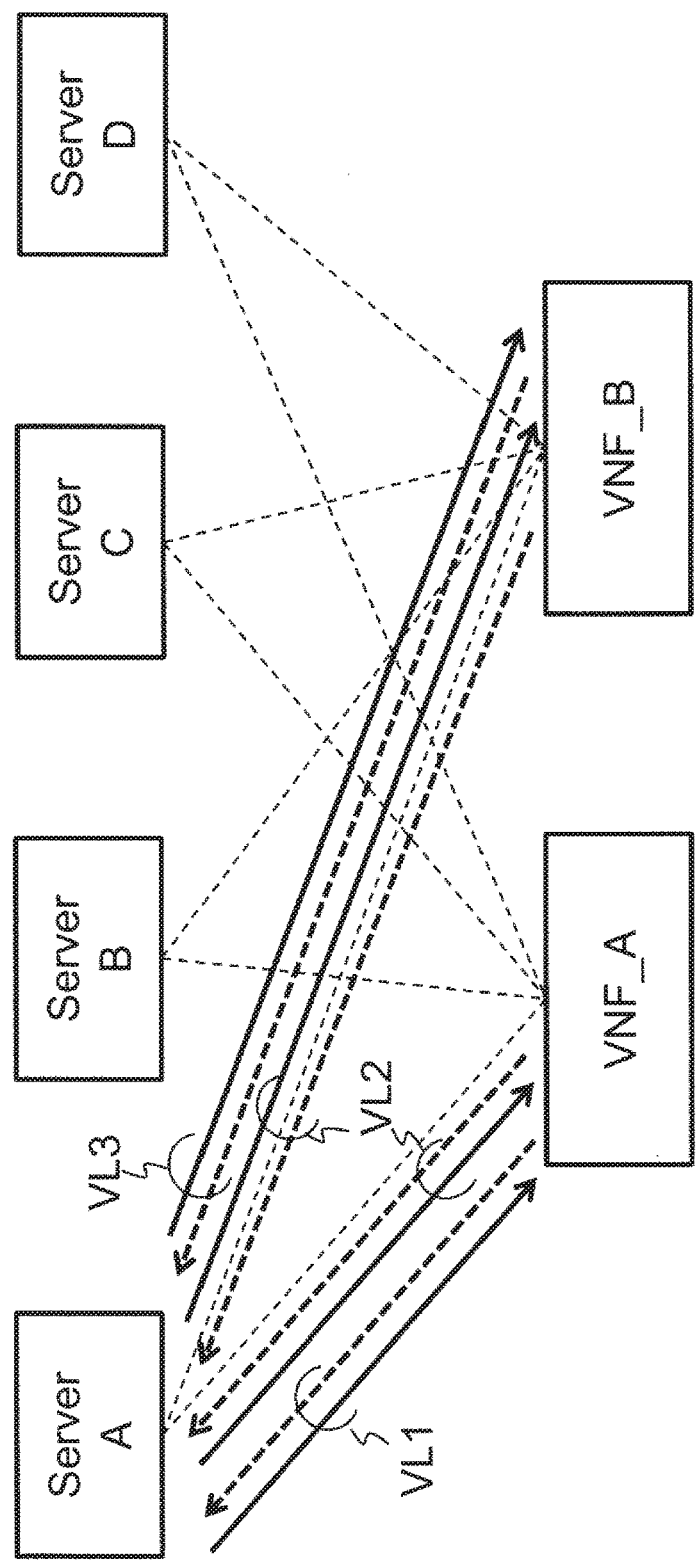
FIG. 29 is a schematic network diagram for describing a computing constraint at the time of determining VNF deployment in FIG. 26.

The computing constraint is a condition for accommodating computing resources (CPU and memory capacities and the like) required by a virtual machine (VM), and the total sum of resources required by virtual machines (VMs) using a server must be able to be accommodated within the available resources of this server. In consideration of overlapping as shown in FIG. 29, the following expression needs to be satisfied.

$$\sum_{v:vm\_id} \frac{\sum_{x|dst^x=v} upath_{sv}^x \cdot required\_cpu^v}{\sum_{x|dst^x=v} 1} < \quad \text{[Math 6]}$$

available_cpu$^s$ ($\forall s$: all server)

6.5) VNF Link Constraint

The VNF link constraint is a condition for determining a target on which a virtual machine (VM) executing a VNF is deployed. Only one link must be used between a virtual machine (VM) and a server, which will be described next. A description will be given by using VNF_A as an example, as shown in FIG. 30.

For the use of links from the server to the VM (VNF_A), all virtual links having the VM as their destination must be used equally as shown in (A) of FIG. 30, as expressed by the following equation:

upath$_{sv}^x$=upath$_{sv}^y$($\forall s, \forall v, \forall x|dst^x=v, \forall y|dst^x=v$).

For the use of links from the VM (VNF_A) to the server, all virtual links having the VM as their source must be used equally as shown in (B) of FIG. 30, as expressed by the following equation:

upath$_{sv}^x$=upath$_{sv}^y$($\forall s, \forall v, \forall x|src^x=v, \forall y|src^x=v$).

The use of a link from the server to the VM (VNF_A) and the use of a link from the VM (VNF_A) to the server must be equal as shown in (C) of FIG. 30, as expressed by the following equation:

upath$_{sv}^x$=upath$_{sv}^y$($\forall s, \forall v, \forall x|dst^x=v, \forall y|src^x=v$).

6.6) Effects

As described above, according to the present exemplary embodiment, a set of the physical links (upath$^x_{ij}$=1) that minimizes the objective function C can be calculated as an optimum solution to VNF deployment by linear programming under the above-described constraints. This optimum solution is an optimum solution in the extended topology including both a network path and VNF deployment, and it is thus possible to achieve service chaining deployment, taking consideration of both computing and networking resources. Moreover, the use of integer programming makes it possible to quickly obtain VNF deployment on the network.

INDUSTRIAL APPLICABILITY

The present invention can be applied to a system for deploying virtual network functions (VNFs) on a network.

REFERENCE SIGNS LIST 10, 11, 12 Control apparatus
20 Network
30, 31 Operation and management apparatus
111 Database
112 Path determination section
113 Control section
122 Path determination section
122a Network condition comparison section
122b Computing condition comparison section
131 Control section
132 Network control section
133 Virtual machine control section
301 Virtual link setting section
302 Requirement setting section
303 Interface
304 User interface
305 Network condition setting section
306 Computing condition setting section
311 Path control section
400 Operation and management screen
400a Input window
400b Network display window
401 Service chain entry field
402 Requirement entry field
501 Data forwarding section
502 Path information database
503 Interface
600 Virtual switch
601 Data forwarding section
602 Path information database
603 Interface
701, 702, 703 OpenFlow switch
704 OpenFlow controller
705 Security channel
706 Flow table

The invention claimed is:

1. A network management apparatus connected with an underlay network having a plurality of physical nodes, a plurality of physical servers, and a plurality of physical links connecting the physical nodes, connecting the physical servers, and connecting the physical nodes and the physical servers, the network management apparatus comprising:
one or more processors, an input unit, a display unit, and a database,
wherein:
the database is configured to store computing resource information available to the physical servers and network resource information available to the physical links, and
the one or more processors are configured to:
receive, from the input unit, a service chain in which at least one virtual network function (VNF) is incorporated between two physical endpoint nodes, serving as both endpoints, among the plurality of the physical nodes, a computing requirement required for the VNF, and a network requirement required for a virtual link (VL) from one of the endpoint nodes to the VNF and a virtual link (VL) between the VNFs, display, on the display unit, an extended topology in which a VNF node corresponding to the VNF and a path connecting the VNF node and the physical server are added to a topology of the underlay network, and based on the computing resource information and the network resource information stored in the database, determine an optimum physical server on which the VNF is deployed, determine a set of optimum physical links to be mapped to the VL from one of the endpoint nodes of the service chain to the optimum physical server on which the VNF is deployed and to the VL between the VNFs, and display, on the display unit, an optimum path by the set of the optimum physical links while superimposing the optimum path on the extended topology.

2. The network management apparatus according to claim 1, wherein the one or more processors are configured to determine the set of the optimum physical links by using Integer Programming.

3. The network management apparatus according to claim 2, wherein in a case where the one or more processors are configured to determine the set of the optimum physical links by using the Integer Programming, the one or more processors are configured to derive a set of physical links satisfying $upath^x_{ij}=1$ in which an objective function becomes minimum by using a predetermined constraint, wherein:

the computing requirement required for the VNF is expressed by required $cpu^x$ (x:vnf id), the network requirement required for the VL is expressed by required $bw^x$ (x:vl id), the physical link is expressed by $upath^x_{ij} \in \{0,1\}$ (x:vl id, i,j:underlay node id), wherein when the VL uses the physical node or the physical link ij between the physical servers i and j, $upath^x_{ij}=1$, the computing resource available to the physical servers is expressed by available $cpu^s$ (s:server id), the network resource available to the physical links is expressed by available $bw_{ij}$ (i:from id, j:to id), and the objective function is expressed by $C=\Sigma_x\Sigma_i\Sigma_j\ upath^x_{ij}$.

4. A network management method performed by a network management apparatus, the network management apparatus being connected with an underlay network having a plurality of physical nodes, a plurality of physical servers, and a plurality of physical links connecting the physical nodes, connecting the physical servers, and connecting the physical nodes and the physical servers, the network management apparatus including one or more processors, an input unit, a display unit, and a database, the database storing computing resource information available to the physical servers and network resource information available to the physical links, the network management method comprising:

receiving, from the input unit, a service chain in which at least one virtual network function (VNF) is incorporated between two physical endpoint nodes, serving as both endpoints, among the plurality of the physical nodes, a computing requirement required for the VNF, and a network requirement required for a virtual link (VL) from one of the endpoint nodes to the VNF and a virtual link (VL) between the VNFs, displaying, on the display unit, an extended topology in which a VNF node corresponding to the VNF and a path connecting the VNF node and the physical server are added to a topology of the underlay network, and based on the computing resource information and the network resource information stored in the database, determining an optimum physical server on which the VNF is deployed, determining a set of optimum physical links to be mapped to the VL from one of the endpoint nodes of the service chain to the optimum physical server on which the VNF is deployed and to the VL between the VNFs, and displaying, on the display unit, an optimum path by the set of the optimum physical links while superimposing the optimum path on the extended topology.

5. The network management method according to claim 4, wherein the one or more processors are configured to determine the set of the optimum physical links by using Integer Programming.

6. The network management method according to claim 5, wherein when the one or more processors determine the set of the optimum physical links by using the Integer Programming, the one or more processors are configured to derive a set of physical links satisfying $upath^x_{ij}=1$ in which an objective function becomes minimum by using a predetermined constraint, wherein:

the computing requirement required for the VNF is expressed by required $cpu^x$ (x:vnf id), the network requirement required for the VL is expressed by required $bw^x$ (x:vl id), the physical link is expressed by $upath^x_{ij} \in \{0,1\}$ (x:vl id, i,j:underlay node id), wherein when the VL uses the physical node or the physical link ij between the physical servers i and j, $upath^x_{ij}=1$, the computing resource available to the physical servers is expressed by available $cpu^s$ (s:server id), the network resource available to the physical links is expressed by available $bw_{ij}$ (i:from id, j:to id), and the objective function is expressed by $C=\Sigma_x\Sigma_i\Sigma_j\ upath^x_{ij}$.

7. A network system comprising:

an underlay network having a plurality of physical nodes, a plurality of physical servers, and a plurality of physical links connecting the physical nodes, connecting the physical servers, and connecting the physical nodes and the physical servers;

a control apparatus connected with the underlay network; and a management apparatus that manages the control apparatus, wherein:

the management apparatus includes first one or more processors, an input unit, a display unit, and a database, the database is configured to store computing resource information available to the physical servers and network resource information available to the physical links, the first one or more processors are configured to:

receive from the input unit, and notify the control apparatus of, a service chain in which at least one virtual network function (VNF) is incorporated between two physical endpoint nodes, serving as both endpoints, among the plurality of the physical nodes, a computing requirement required for the VNF, and a network requirement required for a virtual link (VL) from one of the endpoint nodes to the VNF and a virtual link (VL) between the VNFs, and display, on the display unit, an extended topology in which a VNF node corresponding to the VNF and a path connecting the VNF node and the physical server are added to a topology of the underlay network, the control apparatus includes second one or more processors, wherein the second one or more processors are configured to:
- based on the service chain, the computing requirement, and the network requirement notified from the first one or more processors, and on the computing resource information and the network resource information stored in the database,
  - determine an optimum physical server on which the VNF is deployed, and
  - determine a set of optimum physical links to be mapped to the VL from one of the endpoint nodes of the service chain to the optimum physical server on which the VNF is deployed and to the VL between the VNFs, and
- notify the first one or more processors of the set of the optimum physical links, and the first one or more processors are configured to display, on the display unit, an optimum path by the set of the optimum physical links by superimposing the optimum path on the extended topology.

8. A non-transitory computer readable medium storing a program comprising instructions for causing a network management apparatus to execute a network management method, wherein the network management apparatus is connected with an underlay network having a plurality of physical nodes, a plurality of physical servers, and a plurality of physical links connecting the physical nodes, connecting the physical servers, and connecting the physical nodes and the physical servers, and the apparatus includes one or more processors, an input unit, a display unit, and a database, the database storing computing resource information available to the physical servers and network resource information available to the physical links, the network management method comprising:

receiving, from the input unit, a service chain in which at least one virtual network function (VNF) is incorporated between two physical endpoint nodes, serving as both endpoints, among the plurality of the physical nodes, a computing requirement required for the VNF, and a network requirement required for a virtual link (VL) from one of the endpoint nodes to the VNF and a virtual link (VL) between the VNFs, displaying, on the display unit, an extended topology in which a VNF node corresponding to the VNF and a path connecting the VNF node and the physical server are added to a topology of the underlay network, and based on the computing resource information and the network resource information stored in the database,
- determining an optimum physical server on which the VNF is deployed,
- determining a set of optimum physical links to be mapped to the VL from one of the endpoint nodes of the service chain to the optimum physical server on which the VNF is deployed and to the VL between the VNFs, and
- displaying, on the display unit, an optimum path by the set of the optimum physical links while superimposing the optimum path on the extended topology.

* * * * *

UNITED STATES PATENT AND TRADEMARK OFFICE
CERTIFICATE OF CORRECTION

PATENT NO. : 10,230,581 B2
APPLICATION NO. : 15/117179
DATED : March 12, 2019
INVENTOR(S) : Itsumi It is certified that error appears in the above-identified patent and that said Letters Patent is hereby corrected as shown below:

In the Claims

Claim 3, Column 19, Line 33, "required cpu$^x$ (x:vnf id)," should read --required_cpu$^x$ (x:vnf_id),--.

Claim 3, Column 19, Line 35, "required bw$^x$ (x:vl id)," should read --required_bw$^x$ (x:vl_id),--.

Claim 3, Column 19, Lines 36-37, "(x:vl id, i,j:underlay node id)," should read --(x:vl_id, i,j:underlay_node_id),--.

Claim 3, Column 19, Line 41, "available cpu$^s$ (s:server id)," should read --available_cpu$^s$ (s:server_id),--.

Claim 3, Column 19, Line 43, "available bw$_{ij}$ (i:from id, j:to id)," should read --available_bw$_{ij}$ (i:from_id, j:to_id),--.

Claim 6, Column 20, Line 28, "required cpu$^x$ (x:vnf id)," should read --required_cpu$^x$ (x:vnf_id),--.

Claim 6, Column 20, Line 30, "required bw$^x$ (x:vl id)," should read --required_bw$^x$ (x:vl_id),--.

Claim 6, Column 20, Lines 31-32, "(x:vl id, i,j:underlay node id)," should read --(x:vl_id, i,j:underlay_node_id),--.

Claim 6, Column 20, Line 36, "available cpu$^s$ (s:server id)," should read --available_cpu$^s$ (s:server_id),--.

Claim 6, Column 20, Line 38, "available bw$_{ij}$ (i:from id, j:to id)," should read --available_bw$_{ij}$ (i:from_id, j:to_id),--.

Signed and Sealed this
Ninth Day of July, 2019

Andrei Iancu
*Director of the United States Patent and Trademark Office*